US012681431B2

(12) United States Patent
Matusik et al.

(10) Patent No.: US 12,681,431 B2
(45) Date of Patent: Jul. 14, 2026

(54) REAL-TIME PHOTOREALISTIC 3D HOLOGRAPHY WITH DEEP NEURAL NETWORKS

(71) Applicant: Massachusetts Institute of Technology, Cambridge, MA (US)

(72) Inventors: Wojciech Matusik, Lexington, MA (US); Liang Shi, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 937 days.

(21) Appl. No.: 17/919,842

(22) PCT Filed: Apr. 21, 2021

(86) PCT No.: PCT/US2021/028449
§ 371 (c)(1),
(2) Date: Oct. 19, 2022

(87) PCT Pub. No.: WO2021/216747
PCT Pub. Date: Oct. 28, 2021

(65) Prior Publication Data
US 2023/0205133 A1 Jun. 29, 2023

Related U.S. Application Data

(60) Provisional application No. 63/167,441, filed on Mar. 29, 2021, provisional application No. 63/013,308, filed on Apr. 21, 2020.

(51) Int. Cl.
*G03H 1/00* (2006.01)
*G03H 1/04* (2006.01)

(52) U.S. Cl.
CPC ..................................... *G03H 1/04* (2013.01)

(58) Field of Classification Search
CPC ....................................................... G03H 1/04
USPC ............................................................. 703/6
See application file for complete search history.

(56) References Cited

U.S. PATENT DOCUMENTS 11,231,584 B2 *  1/2022  Klug ..................... G02B 30/40
2015/0277377 A1  10/2015  Tsang
2016/0026253 A1  1/2016  Bradski et al.
2018/0158175 A1  6/2018  Shmunk et al.
(Continued)

OTHER PUBLICATIONS

Shi, L., Li, B., Kim, C. et al. Towards real-time photorealistic 3D holography with deep neural networks. Nature 591, 234-239 (2021). DOI: 10.1038/s41586-020-03152-0.
(Continued)

*Primary Examiner* — Tiffany P Young
(74) *Attorney, Agent, or Firm* — Young Basile Hanlon & MacFarlane, P.C.

(57) ABSTRACT

A method for producing a hologram representative of a subject three-dimensional scene includes receiving and storing input digital data characterizing a first image of the subject three-dimensional scene. The method further includes processing the data in a neural network that has been trained to transform the input digital data into a holographic representation of the subject three-dimensional scene, the representation containing phase information characterizing depth and parallax of the scene. The method also includes providing an output of the holographic representation of the subject three-dimensional scene.

21 Claims, 33 Drawing Sheets

(56) References Cited

U.S. PATENT DOCUMENTS

| | | |
|---|---|---|
| 2018/0164592 A1 | 6/2018 | Lopes et al. |
| 2018/0373200 A1 | 12/2018 | Shi et al. |
| 2020/0192287 A1 | 6/2020 | Chakravarthula et al. |

OTHER PUBLICATIONS

Hao Zhang, Liangcai Cao, and Guofan Jin, "Computer-generated hologram with occlusion effect using layer-based processing," Appl. Opt. 56, F138-F143 (2017).

Yoon, S. et al., "A Framework for Multi-View Video Coding Using Layered Depth Images," Adnaces in Multimedia Information Processing-PCM 2005, 6th Pacific-Rim Conference on Multimedia, Jeju Island Korea, Nov. 13-16, 2005, pp. 431-442.

Peng, Y. et al., "Neural holography with camera-in-the-loop training," ACM Transaction on Graphics, ACM, NY, vol. 39, No. 6, Nov. 26, 2020, pp. 1-14.

International Search Report and Written Opinion, PCT Application PCT/US2021/028449 , mailed Sep. 22, 2021 (4 pages).

Shade, Jonathan, Steven Gortler, Li-wei He, and Richard Szeliski. "Layered depth images." In Proceedings of the 25th annual conference on Computer graphics and interactive techniques, pp. 231-242. 1998.

Maimone et al., "Holographic Near-Eye Displays for Virtual and Augmented Reality", ACM Transactions on Graphics, vol. 36, No. 4, Article 85. Publication date: Jul. 2017, pp. 16.

* cited by examiner

REAL-TIME PHOTOREALISTIC 3D HOLOGRAPHY WITH DEEP NEURAL NETWORKS

CROSS-REFERENCE TO RELATED APPLICATIONS

This application is a U.S. National Phase of PCT Application No. PCT/US2021/028449, filed on Apr. 21, 2021, which claims priority to U.S. Provisional Application No. 63/013,308 filed Apr. 21, 2020 and entitled "Real-Time Photorealistic 3D Holography with Deep Neural Networks." PCT/US2021/028449 further claims priority to U.S. Provisional Application No. 63/167,441 filed on Mar. 29, 2021 and entitled "Data-Efficient Photorealistic 3D Holography using Layered Depth Images and Deep Double Phase Encoding." The foregoing applications are incorporated herein by reference in their entireties.

TECHNICAL FIELD

The present invention relates to color holography, and more particularly to real-time photorealistic 3D holography with deep neural networks.

BACKGROUND ART

Holography is the process of encoding a light field as an interference pattern of variations in phase and amplitude. When properly lit, a hologram diffracts an incident light into an accurate reproduction of the original light field, producing a true-to-life recreation of the recorded three-dimensional (3D) objects. The reconstructed 3D scene presents accurate monocular and binocular depth cues, which are difficult to simultaneously achieve in traditional displays. Yet, creating photorealistic computer-generated holograms (CGHs) power-efficiently and in real time remains an unsolved challenge in computational physics. The primary challenge is the tremendous computational cost required to perform Fresnel diffraction simulation for every object point in a continuous 3D space. This remains true despite extensive efforts to design various digital scene representations and algorithms for the detection of light occlusions.

The challenging task of efficient Fresnel diffraction simulation has been tackled by explicitly trading physical accuracy for computational speed. Hand-crafted numerical approximations based on look-up tables of precomputed elemental fringes, multilayer depth discretization, holographic stereograms, wavefront recording plane (alternatively intermediate ray sampling planes) and horizontal/vertical-parallax-only modelling were introduced at a cost of compromised image quality. Harnessing rapid advances of graphics processing unit (GPU) computing, the non-approximative point-based method (PBM) recently produced colour and textured scenes with per-pixel focal control at a speed of seconds per frame. Yet, PBM simulates Fresnel diffraction independently for every scene point, and thus does not model occlusion. This prevents accurate recreation of complex 3D scenes, where the foreground will be severely contaminated by ringing artefacts due to the unoccluded background. This lack of occlusion is partially addressed by light-field rendering. However, this approach incurs substantial rendering and data storage overhead, and the occlusion is only accurate within a small segment (holographic element) of the entire hologram. Adding a per-ray visibility test during Fresnel diffraction simulation ideally resolves the problem, yet the additional cost of an occlusion test, access for neighbour points and conditional branching slow down the computation. This quality-speed trade-off is a trait shared by all prior art physically based approaches and fundamentally limits the practical deployment of dynamic holographic displays.

SUMMARY OF THE EMBODIMENTS

In accordance with one embodiment of the invention, there is provided a method for producing a hologram representative of a subject three-dimensional scene. In this embodiment, the method includes receiving and storing input digital data characterizing a first image of the subject three-dimensional scene; processing the data in a neural network that has been trained to transform the input digital data into a holographic representation of the subject three-dimensional scene, the representation containing phase information characterizing depth and parallax of the scene; and providing an output of the holographic representation of the subject three-dimensional scene.

In a further related embodiment, the holographic representation encodes color information of the scene. In another related embodiment, the neural network is a convolutional neural network. In another related embodiment, the digital data characterizing the first image includes color and depth information, and the holographic representation including amplitude and phase information by color. In yet another related embodiment, processing the data is configured to produce a holographic representation that reproduces occlusion effects. In another related embodiment, the neural network has been trained to simulate Fresnel diffraction. As further option, the neural network has been additionally trained to cause the holographic representation to exhibit a desired depth of field effect.

In another related embodiment, the neural network has been trained on training data representing scenes constructed from samples of random three-dimensional meshes having random textures. As a further option, the training data are configured to follow a probability density function in such a manner as to have a uniform pixel distribution across a range of depths. Furthermore, optionally, the training data are configured to support a range of display resolutions.

In another related embodiment, the method includes, before providing the output of the holographic representation, performing anti-aliasing processing of the holographic representation to render it displayable with reduced artifacts. In yet another embodiment, wherein the digital data characterize a stream of images occurring at an average frame rate, the processing is configured to occur in real time.

Another embodiment provides a method of generating a data set configured for training a neural network for use in processing data associated with a three-dimensional scene. In this embodiment, the method includes processing a set of samples of random three-dimensional meshes having random textures in a manner that a surface of the mesh defines a set of pixels representing the scene in the three-dimensional space, wherein the meshes are configured to cause the set of pixels to have a uniform pixel distribution across a range of depths; and using the processed set of samples to create a corresponding set of training holograms.

A further related embodiment provides a method of training a neural network to transform an input of digital data into a holographic representation of a subject three-dimensional scene, the representation containing phase information characterizing depth and parallax of the scene. In this embodiment, the method includes providing the data set generated according to the previous paragraph and constraining the neural network with objective functions.

The output of the holographic representation of the subject three-dimensional scene can be used for operating a display that reproduces the three-dimensional scene. The output can also be used for consumer holographic displays for AR/VR, holography-based single-shot volumetric 3D printer, optical trapping with significantly increased foci, and real-time simulation for holographic microscopy.

In accordance with yet another embodiment of the invention, there is provided a method for producing a hologram representative of a subject three-dimensional scene. In this embodiment, the method includes receiving and storing input digital data characterizing a set of images of the subject three-dimensional scene; processing the data in a neural network that has been trained to transform the input digital data into a phase-only holographic representation of the subject three-dimensional scene, the representation containing phase information characterizing depth and parallax of the scene, wherein the representation is computed to take into account effects of wave-based occlusion with respect to the complete scene; and providing an output of the holographic representation of the subject three-dimensional scene.

In a further related embodiment, the holographic representation encodes color information of the scene. In another related embodiment, the neural network is a convolutional neural network. In another related embodiment, processing the data further includes performing aberration correction. In yet another related embodiment, performing aberration correction is carried out in a frequency domain of the scene.

As further option, the neural network has been additionally trained to cause the holographic representation to be focused on any desired focal plane within the subject three-dimensional scene so as to exhibit a desired depth of field.

In another related embodiment, the neural network has received additional training in two stages to directly optimize the phase-only hologram (with anti-aliasing processing) by incorporating a complex to phase-only conversion into the training, wherein in a first stage the neural network is trained to predict a midpoint hologram propagated to a center of the subject three-dimensional scene and to minimize a difference between a target focal stack and a predicted focal stack, and in a second stage a phase-only target hologram is generated from the predicted midpoint hologram and refined by calculating a dynamic focal stack loss, between a post-encoding focal stack and the target focal stack, and a regularization loss associated therewith.

In another related embodiment, wherein the digital data characterize a stream of images occurring at an average frame rate, the processing is configured to occur in real time.

Alternatively or in addition, the set of images of the subject three-dimensional scene includes a plurality of layered depth images. Also alternatively or in addition, the set of images of the subject three-dimensional scene is a single RGBD image.

Another embodiment provides a method for producing a hologram representative of a subject three-dimensional scene. In this embodiment, the method includes receiving and storing input digital data characterizing a set of images of the subject three-dimensional scene; processing the data in a neural network that has been trained to transform the input digital data into a phase-only holographic representation of the subject three-dimensional scene and has been further trained in two stages to directly optimize the phase-only hologram (with anti-aliasing processing) by incorporating a complex to phase-only conversion into the training, wherein in a first stage the neural network is trained to predict a midpoint hologram propagated to a center of the subject three-dimensional scene and to minimize a difference between a target focal stack and a predicted focal stack, and in a second stage a phase-only target hologram is generated from the predicted midpoint hologram and refined by calculating a dynamic focal stack loss, between a post-encoding focal stack and the target focal stack, and a regularization loss associated therewith, the representation containing phase information characterizing depth and parallax of the scene; and providing an output of the holographic representation of the subject three-dimensional scene of generating a data set configured for training a neural network for use in processing data associated with a three-dimensional scene.

A further related embodiment provides a method of calibrating a holographic display. In this embodiment, the method includes causing display of a checkerboard pattern in a hologram developed using double-phase encoding; storing image intensity data produced in the course of varying a phase of the checkerboard pattern; and developing a lookup table from the stored image intensity data to compensate for nonlinearities in the holographic display.

The output of the holographic representation of the subject three-dimensional scene can be used for operating a display that reproduces the three-dimensional scene. The output can also be used for consumer holographic displays for AR/VR, holography-based single-shot volumetric 3D printer, optical trapping with significantly increased foci, and real-time simulation for holographic microscopy.

BRIEF DESCRIPTION OF THE DRAWINGS

The foregoing features of embodiments will be more readily understood by reference to the following detailed description, taken with reference to the accompanying drawings, in which:

FIG. 2A is a simulated depth-of-field image; FIG. 2B is a comparison of focal stacks; FIG. 2C is a simulated depth-of-field image and focal stack; FIG. 2D is a performance comparison; FIG. 2E is a CNN predicted hologram; FIG. 2F is an ablation study; FIG. 2G is a comparison of a ground truth Fresnel zone plate and a CNN prediction;

FIG. 3A is a scheme of the holographic display prototype; FIG. 3B is a 2D target image and a CNN predicted hologram; FIG. 3C is a prototype representing a real-word scene; FIG. 3D is a prototype representing a computer-rendered 3D scene;

DETAILED DESCRIPTION OF SPECIFIC EMBODIMENTS

Figure 1:
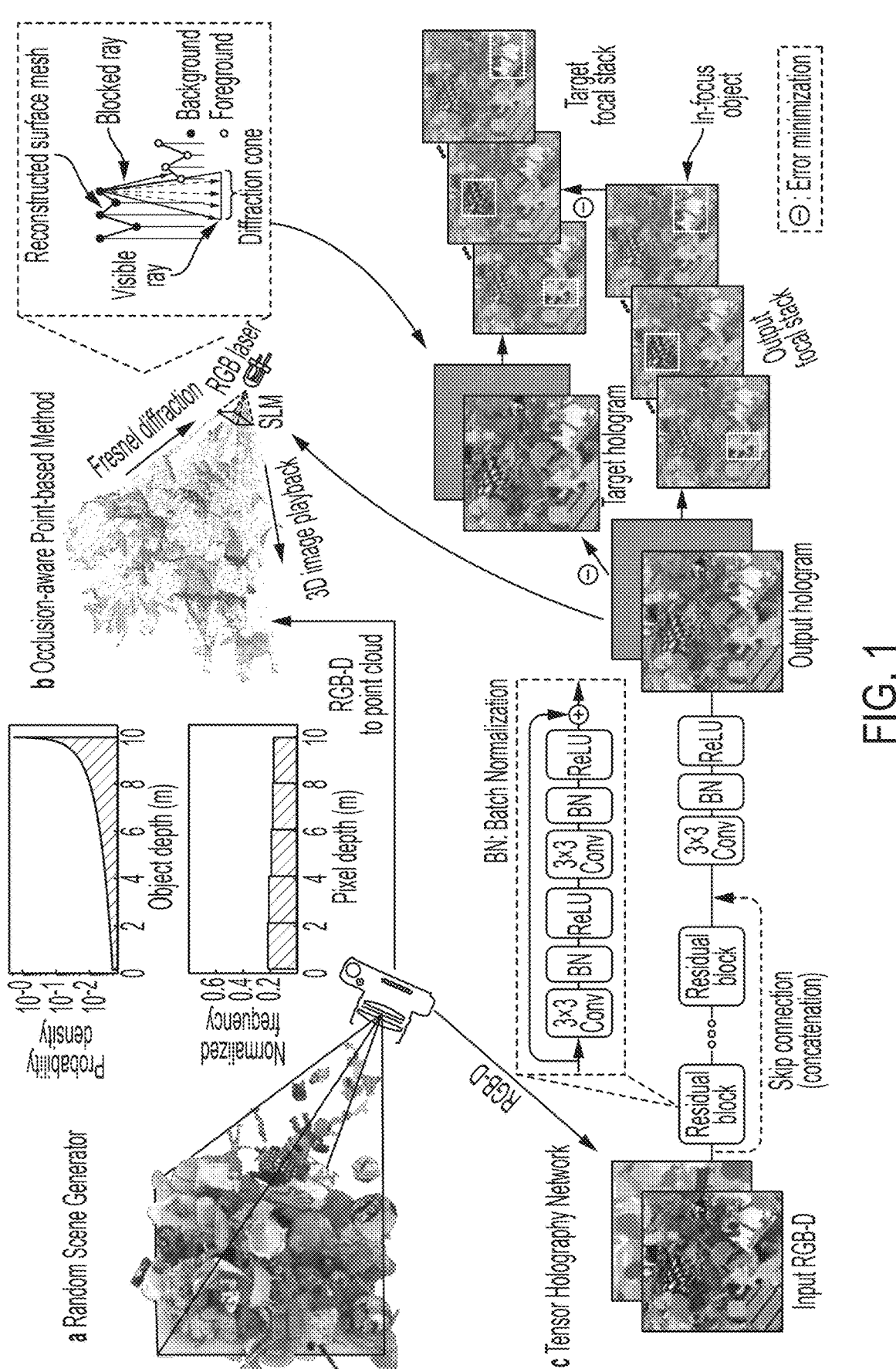
FIG. 1 is a tensor holography workflow for learning Fresnel holograms from RGB-D images.

Definitions. As used in this description and the accompanying claims, the following terms shall have the meanings indicated, unless the context otherwise requires:

An "image" is any multidimensional representation, whether in tangible or otherwise perceptible form, or otherwise, whereby a value of some characteristic (amplitude, phase, etc.) is associated with each of a plurality of locations corresponding to dimensional coordinates of an object in physical space, though not necessarily mapped one-to-one thereon. Thus, for example, the graphic display of the spatial distribution of some field, either scalar or vectorial, such as brightness or color, constitutes an image. So, also, does an array of numbers, such as a 3D holographic dataset, in a computer memory or holographic medium. Similarly, "imaging" refers to the rendering of a stated physical characteristic in terms of one or more images.

A "hologram" is an image, of an interference pattern, the image using diffraction to reproduce a three-dimensional light field associated with a physical scene, so as to retain depth, parallax, and other properties of the scene, such as color and occlusion of objects attributable to depth relative to a fiducial viewing position.

Training data have a "uniform pixel distribution" across a range of depths when the probability of a number of pixels occurring, at any selected one of a number of depth intervals, is within a specified threshold of the probability of the same number of pixels occurring at another one of the depth intervals.

Processing in a neural network of digital data characterizing a stream of images occurring at an average frame rate occurs in "real time" when the processing is sufficiently rapid as to provide holographic representations from the stream of images at the average frame rate.

A "set" includes at least one member.

In a first embodiment of the present invention, we disclose a neural network-enhanced holographic representation (hereinafter the "first embodiment"). We overcome the deficiencies of the prior art with a physics-guided deep-learning approach, dubbed tensor holography. Tensor holography avoids the explicit approximation of Fresnel diffraction and occlusion, but imposes underlying physics to train a convolutional neural network (CNN) as an efficient proxy for both. It exploits the fact that propagating a wave field to different distances is equivalent to convolving the same wave field with Fresnel zone plates of different frequencies. As the zone plates are radially symmetric and derived from a single basis function using different propagation distances, our network accurately approximates them through successive application of a set of learned 3×3 convolution kernels. This reduces diffraction simulation from spatially varying large kernel convolutions to a set of separable and spatially invariant convolutions, which runs orders of magnitude faster on GPUs and application-specific integrated circuits (ASICs) for accelerated CNN inference. Our network further leverages nonlinear activation (that is, ReLU or the rectified linear unit) in the CNN to handle occlusion. The nonlinear activation selectively distributes intermediate results produced through forward propagation, thus stopping the propagation of occluded wavefronts. We note that although the mathematical model of the CNN is appealing, the absence of a large-scale Fresnel hologram dataset and an effective training methodology impeded the development of any learning-based approach. Despite recent successful adoption of CNNs for phase retrieval and for recovering in-focus images or extended depth-of-field images from optically recorded digital holograms, Fresnel hologram synthesis, as an inverse problem, is more challenging and demands a carefully tailored dataset and design of the CNN. In the prior art, the potential suitability of CNNs for the hologram synthesis task has been demonstrated for only 2D images positioned at a fixed depth and for post compression.

In a second embodiment of the present invention, we disclose a neural network-enhanced layered depth image holographic representation (hereinafter the "second embodiment"). We disclose the use of layered depth images (LDI) as the volumetric 3D representation and we detail why it is more data-efficient and learning-algorithm friendly than other volumetric representations such as light fields, general point clouds, or voxel grids. We show that the use of LDI breaks the coupling of data preparation and layer partition in the original occlusion-aware layer-based method (OA-LBM), allowing us to partition the 3D volume into extremely dense layers and achieve fine-grained depth allocation on par with PBM or its variants. OA-LBM also avoids a mixed use of ray-based and wave-based models, resulting in physically-accurate defocus responses at both foreground and background sides.

The use of LDI plus OA-LBM resolves the aforementioned artifacts, but increases the memory and rendering cost of input data and significantly slows down the runtime since occlusion handling requires sequential processing from back to front. The LDI input also limits the use of real-world captured data as it is much more difficult to acquire than capturing a single RGB-D image. To resolve both issues, we introduce a hologram dataset consisting of LDIs and their corresponding holograms. We demonstrate a CNN trained on this new dataset achieves high-quality 3D hologram prediction in real-time. In addition, we show a CNN trained with only the first layer of LDI (essentially a single RGB-D image) and the LDI-computed holograms can produce a visually convincing approximation, thus removing the need of using full LDI input at the inference time.

In accordance with the second embodiment, we further disclose an end-to-end phase-only 3D hologram prediction workflow. Converting a complex hologram to a phase-only hologram or directly optimizing a phase-only hologram is an unavoidable step to instantiate a hologram on a phase-only spatial light modulator. Optimization-based approaches are generally time-consuming, but very effective in synthesizing high-quality 2D holograms. However, in the prior art no convincing results have been demonstrated for 3D holograms with per-pixel depth. Explicit complex to phase-only conversions, such as the double phase method (DPM), are instantaneous and applicable to both 2D and continuous 3D holograms, but do not always work well due to two reasons. First, in the phase map of the complex hologram where high-frequency detail presents, the decomposed checkerboard pattern could break as the neighboring high and low phase values picked from two decomposed phase maps no longer preserve the size relationship. The break of checkerboard pattern (grating structure) leads to speckle noise since excessive energy cannot be pushed to the edges of the exit pupil and filtered out in the Fourier space. Second, if the phase map has large standard deviation, substantial phase warping can happen even if the entire phase map is centered at half of the SLM's maximum phase modulation. In experiment, phase warping significantly degrades the captured result quality.

An anti-aliasing double phase method (AA-DPM) pre-blurs the complex hologram with a Gaussian kernel before the decomposition to avoid aliasing. Combined with phase initialization, it demonstrates high-quality artifacts-free 2D and 3D results. Although simple and effective, the minimal amount of blur for AA-DPM is found through trial and error for different scenes. Thus, for an unknown input sequence, a conservative blur is required to avoid artifacts in any of the frames. Meanwhile, high frequency phase alternations mainly present around occlusion boundaries and high-frequency textures. Therefore, a uniform blur could remove details that would otherwise present at low phase variation regions. In addition, when the relative distance between the hologram plane and the 3D volume gets longer, we observe the blur required to produce an artifacts-free 3D image becomes larger. This is understandable as longer propagation distance leads to bigger subholograms and more high-frequency fringes at their peripherals. These findings urge a more intelligent method that can adaptively (ideally without human intervention) encode the complex hologram based on its local statistics, maximally preserve the image quality, be fully automatic and insensitive to the distance between the hologram plane and the 3D volume.

In the instant disclosure, we extend the idea of end-to-end learning with deep optics, and propose a deep double phase method (DDPM) by integrating the encoding step into the differentiable wave propagation model. DDPM is trained to directly optimize the complex hologram resulted from filtering the encoded phase-only hologram, relegating the CNN to discover the optimal strategy for modifying the complex hologram prior to the encoding. We show DDPM quantitatively and qualitatively outperforms AA-DPM under different scenes and arrangements of hologram plane and 3D volume while maintaining the negligible computational overhead.

Finally, hardware imperfection is a primary reason for poor experimental results. In this disclosure, we introduce a suite of calibration procedures with a new method to explicitly characterize a per-pixel non-linear phase-to-voltage lookup table for the SLM. We also detail how to augment OA-LBM with aberration correction and experimentally demonstrate its effectiveness.

First Embodiment—Neural Network-Enhanced Holographic Representation

FIG. 1 is a tensor holography workflow for learning Fresnel holograms from RGB-D images in accordance with the first embodiment of the present invention. In FIG. 1 section a, a custom ray-tracer renders an RGB-D image of a random scene. The meshes are distributed exponentially along the depth axis and the resulting pixel depth distribution is statistically uniform. In FIG. 1 section b, an OA-PBM reconstructs a triangular surface mesh from the point cloud defined by the RGB-D image. During Fresnel diffraction simulation, wavefronts carried by the occluded rays are excluded from the hologram calculation. In FIG. 1 section c, a fully convolutional residual network synthesizes a Fresnel hologram from the same RGB-D image. The network is optimized against the target hologram using a data fidelity loss and a focal stack loss. BN denotes batch renormalization. The minus symbol indicates error minimization. The plus symbol denotes layer concatenation along the color channel. Cony indicates convolution.

Hologram Dataset of Tensor Holography

To facilitate training CNNs for this task, we introduce a large-scale Fresnel hologram dataset, available as MIT-CGH-4K, consisting of 4,000 pairs of RGB-depth (RGB-D) images and corresponding 3D holograms. Our dataset is created with three important features to enable CNNs to learn photorealistic 3D holograms. First, the 3D scenes used for rendering the RGB-D images are constructed with high complexities and large variations in colour, geometry, shading, texture and occlusion to help the CNN generalize to both computer-rendered and real-world captured RGB-D test inputs. This is achieved by a custom random scene generator (FIG. 1 section a), which assembles a scene by randomly sampling 200-250 triangle meshes with repetition from a pool of over 50 meshes and assigning each mesh a random texture from a pool of over 60,000 textures from publicly available texture synthesis datasets with augmentation (more rendering details are disclosed below). Second, the pixel depth distribution of the resulting RGB-D images is statistically uniform across the entire view frustum. This is crucial for preventing the learned CNN from biasing towards any frequently occurring depths and producing poor results at those sparsely populated ones when a non-uniform pixel depth distribution occurs. To ensure this property, we derived a closed-form probability density function (PDF) for arranging triangle meshes along the depth axis (z axis):

$$f_\alpha(z) = \frac{\alpha}{C(z_{far} - z_{near})} \left( \frac{z_{far} - z}{z_{far} - z_{near}} \right)^{\frac{\alpha}{C}-1} (z_{near} \leq z < z_{far}), \quad (1)$$

where $z_{near}$ and $z_{far}$ are the distances from the camera to the near and far plane of the view frustum, C is the number of meshes in the scene and a is a scaling factor calibrated via experimentation. This PDF distributes meshes exponentially along the z axis (FIG. 1 section a, top) such that the pixel depth distribution in the resulting RGB-D images is statistically uniform (FIG. 1 section a, bottom; see below for derivation and comparison with existing RGB-D datasets). Here we set $z_{near}$ and $z_{far}$ to 0.15 m and 10 m, respectively, to accommodate a wide range of focal distances (approximately a 6.6-diopter range for the depth of field). Third, the holograms computed from the RGB-D images can precisely focus each pixel to the location defined by the depth image and properly handle occlusion. This is accomplished by our occlusion-aware point-based method (OA-PBM).

Figure 4:
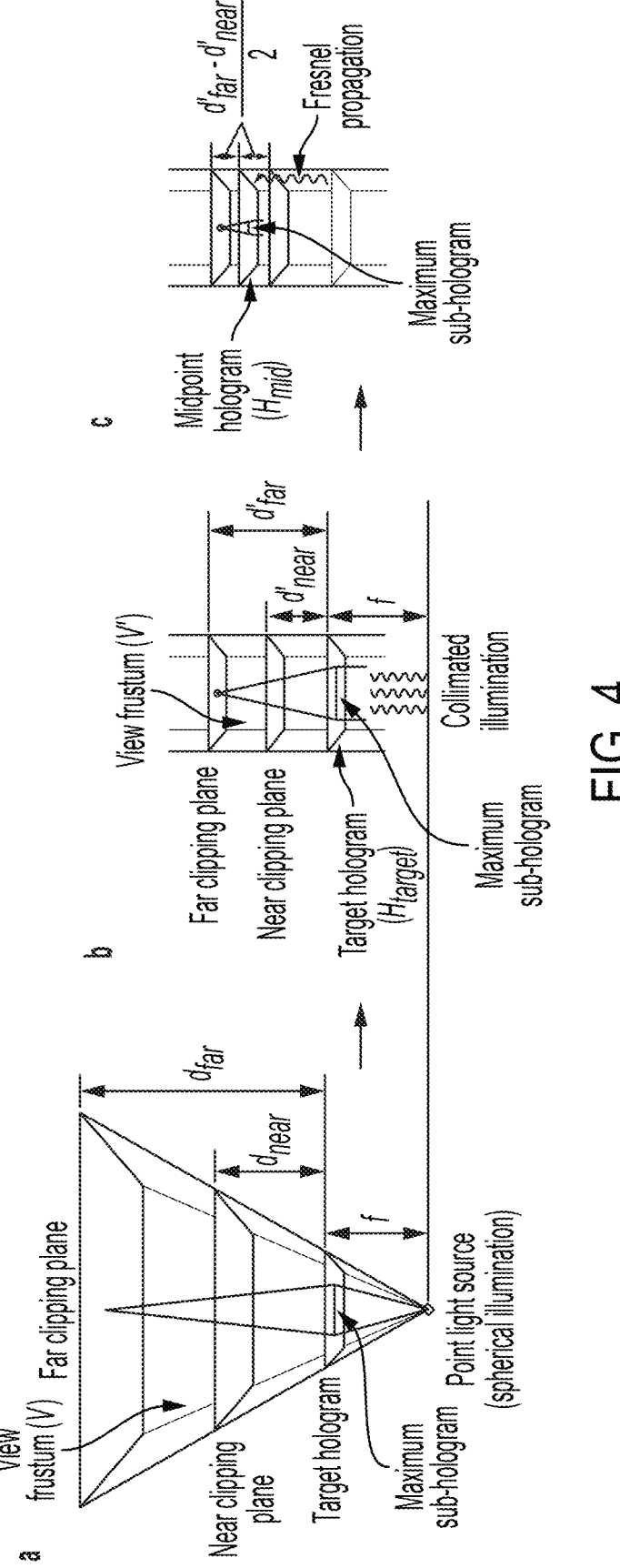
FIG. 4 is a schematic of a midpoint hologram calculation.

The OA-PBM augments the PBM with occlusion detection. Instead of processing each 3D point independently, the OA-PBM reconstructs a triangle surface mesh from the RGB-D image and performs ray casting from each vertex (point) to the hologram plane (FIG. 1 section b). Wavefronts carried by the rays intersecting the surface mesh are excluded from hologram computation to account for foreground occlusion. In practice, a point light source is often used to magnify the hologram for an extended field of view (as shown in FIG. 4A below); thus, the OA-PBM implements configurable illumination geometry to support ray casting towards spatially varying diffraction cones. FIG. 2B visualizes a focal stack refocused from the OA-PBM-computed holograms, in which clean occlusion boundaries are formed and little to no background light leaks into the foreground (see Methods for a comparison with PBM results and OA-PBM implementation details).

Combining the random scene generator and the OA-PBM, we rendered our dataset at wavelengths of 450 nm, 520 nm and 638 nm to match the RGB lasers deployed in our experimental prototype. The MIT-CGH-4K dataset is also rendered for multiple spatial light modulator (SLM) resolutions and has been made publicly available.

Neural Network of Tensor Holography

Our CNN model is a fully convolutional residual network. It receives a four-channel RGB-D image and predicts a colour hologram as a six-channel image (RGB amplitude and RGB phase), which can be used to drive three optically combined SLMs or one SLM in a time-multiplexed manner to achieve full-colour holography. The network has a skip connection that creates a direct feed of the input RGB-D image to the penultimate residual block and has no pooling layer for preserving high-frequency details (see FIG. 1 section c for a scheme of the network architecture). Let W be the width of the maximum subhologram (Fresnel zone plate) produced by the farthest object points to the hologram. We note that the minimal receptive field aggregated from all convolution layers should match W to physically accurately predict the target hologram. Yet, W of the target hologram varies according to the relative position between the hologram plane and the 3D volume, and can often reach hundreds of pixels (see Methods below for derivation), resulting in too many convolution layers and slowing down the inference speed. To address the issue, we apply a preprocessing step to compute an intermediate representation (midpoint hologram), which reduces the effective W and losslessly recovers the target hologram.

FIGS. 4A-4C are a schematic of the midpoint hologram calculation. FIG. 4A, shows a holographic display magnified through a diverging point light source. FIG. 4B shows a holographic display unmagnified through the thin-lens formula. In FIG. 4C, the target hologram in this example is propagated to the center of the unmagnified view frustum to produce the midpoint hologram. The width of the maximum subhologram is substantially reduced The midpoint hologram is an application of the wavefront recording plane. It propagates the target hologram to the centre of the view frustum to optimally minimize the distance to any scene point, thus reducing the effective W. The calculation follows the two steps shown in FIGS. 4A-4C. First, the diverging frustum V induced by the point light source is mathematically converted to an analogous collimated frustum V' using the thin-lens formula describing the magnification of the laser beam (see below for calculation details). The change of representation simplifies the simulation of depth-of-field images perceived in V into free-space propagation of the target hologram to the remapped depth in V'. Let $H_{target} \in C^{M \times N}$ be the target hologram (color channel is omitted here), where C denotes the set of complex numbers, and M and N are the number of pixels along the width and height of the hologram. Let $$d'_{near} \text{ and } d'_{far}$$

be the distances from the target hologram to the near and far clipping plane of V'. $H_{target}$ is propagated for a distance of $$d'_{mid} = (d'_{near} + d'_{far})/2$$

to the centre of V' to form the midpoint hologram $H_{mid} \in C^{M \times N}$ The angular spectrum method (ASM) is employed to model the propagation of a wave field:

$$H_{mid}(m, n) = \tag{2}$$
$$ASM(H_{target}, d'_{mid}) = F^{-1}\left\{F\{H_{target}\}e^{i2\pi d'_{mid}\sqrt{\lambda^{-2}-(m/L_w)^2-(n/L_h)^2}}\right\}.$$

Here, F and $F^{-1}$ are the Fourier and inverse Fourier transform operators, respectively; $L_w$ and $L_h$ are the physical width and height of the hologram, respectively; $\lambda$ is the wavelength; m=−M/2, . . . , M/2−1 and n=−N/2, . . . , N/2−1, where M and N are the number of pixels along the width and height of the hologram. Replacing the target hologram with the midpoint hologram reduces W by a factor of $$d'_{far}/\Delta d', \text{ where } \Delta d' = (d'_{far} - d'_{near})/2.$$

The reduction is a result of eliminating the free-space propagation shared by all the points, and the target hologram can be exactly recovered by propagating the midpoint hologram back for a distance $$-d'_{mid}.$$

In our rendering configuration, where the collimated frustum V' has a 6-mm optical path length, using the midpoint hologram as the CNN's learning objective minimizes the convolution layers to 15.

We introduce two wave-based loss functions to train the CNN to accurately approximate the midpoint hologram and learn Fresnel diffraction. The first loss function serves as a data fidelity measure and computes the phase-corrected $\ell_2$ distance between the output hologram $\tilde{H}_{mid}=\tilde{A}_{mid}e^{i\tilde{\phi}_{mid}} \in C^{M \times N}$ and the ground-truth midpoint hologram $H_{mid}=A_{mid}e^{i\phi_{mid}}$:

$$l_{data} = \|\tilde{A}_{mid} - A_{mid}e^{i(\overline{\delta(\tilde{\phi}_{mid},\phi_{mid})-\delta(\tilde{\phi}_{mid},\phi_{mid})})}\|_2, \tag{3}$$

where $\tilde{A}_{mid}$ and $\tilde{\phi}_{mid}$ are the amplitude and phase of the predicted hologram, $A_{mid}$ and $\phi_{mid}$ are the amplitude and phase of the ground truth hologram, $\delta(\tilde{\phi}_{mid}, \phi_{mid})$=a tan 2(sin($\tilde{\phi}_{mid}-\phi_{mid}$), cos($\tilde{\phi}_{mid}-\phi_{mid}$)), − denotes the mean and $\|\cdot\|_p$ denotes the $\ell_p$ vector norm applied on a vectorized matrix output. The phase correction computes the signed shortest angular distance in the polar coordinates and subtracts the global phase offset, which exerts no impact on the intensity of the reconstructed 3D image.

The second loss function measures the perceptual quality of the reconstructed 3D scene observed by a viewer. As ASM-based wave propagation is a differentiable operation, the loss is modelled as a combination of the $\ell_1$ distance and total variation of a dynamic focal stack, reconstructed at two sets of focal distances that vary per training iteration $$l_{pcp}(t) = \sum_{d_t' \in \{D_t^{fix} \cup D_t^{float}\}}^{Dynamic focal stack} \left\| e^{\beta(2\Delta d' - (d_t' - D_t'))} \right\|^{Attention\ mask} \left( \left| |ASM(\tilde{H}_{mid}, d_t')|^2 - |ASM(H_{mid}, d_t')|^2 \right|^{Image\ difference} + \underbrace{\nabla |ASM(\tilde{H}_{mid}, d_t')|^2 - \nabla |ASM(H_{mid}, d_t')|^2}_{Total\ variation} \right) \right\|_1 . \tag{4}$$

Here, $|\cdot|^2$ denotes element-wise squared absolute value; $\nabla$ denotes the total variation operator; t is the training iteration;

$$D_t' \in R^{M \times N}$$

is the depth channel (remapped to V') of the input RGB-D image, where R denotes the set of real numbers; $\beta$ is a user-defined attention scale;

$$D_t^{fix}$$

and $$D_t^{float}$$

are two sets of dynamic focal distances calculated as follows: (1) V' is equally partitioned into T depth bins, (2)

$$D_t^{fix}$$

picks the top-$k_{fix}$ bins from the histogram $$D_t' \text{ and } D_t^{float}$$

randomly picks $k_{float}$ bins among the rest, and (3) a depth is uniformly sampled from each selected bin. Here, $$D_t^{fix}$$

guarantees the dominant content locations in the current RGB-D image are always optimized, while $$D_t^{float}$$

ensures sparsely populated locations are randomly explored. The random sampling within each bin prevents overfitting to stationary depths, enabling the CNN to learn true 3D holograms. The attention mask directs the CNN to focus on reconstructing in-focus features in each depth-of-field image. FIG. 2F validates the effectiveness of each training loss component through an ablation study.

Figure 2A:
FIGS. 2A-2G are a performance evaluation of the OA-PBM and tensor holography CNN.
Figure 2B:
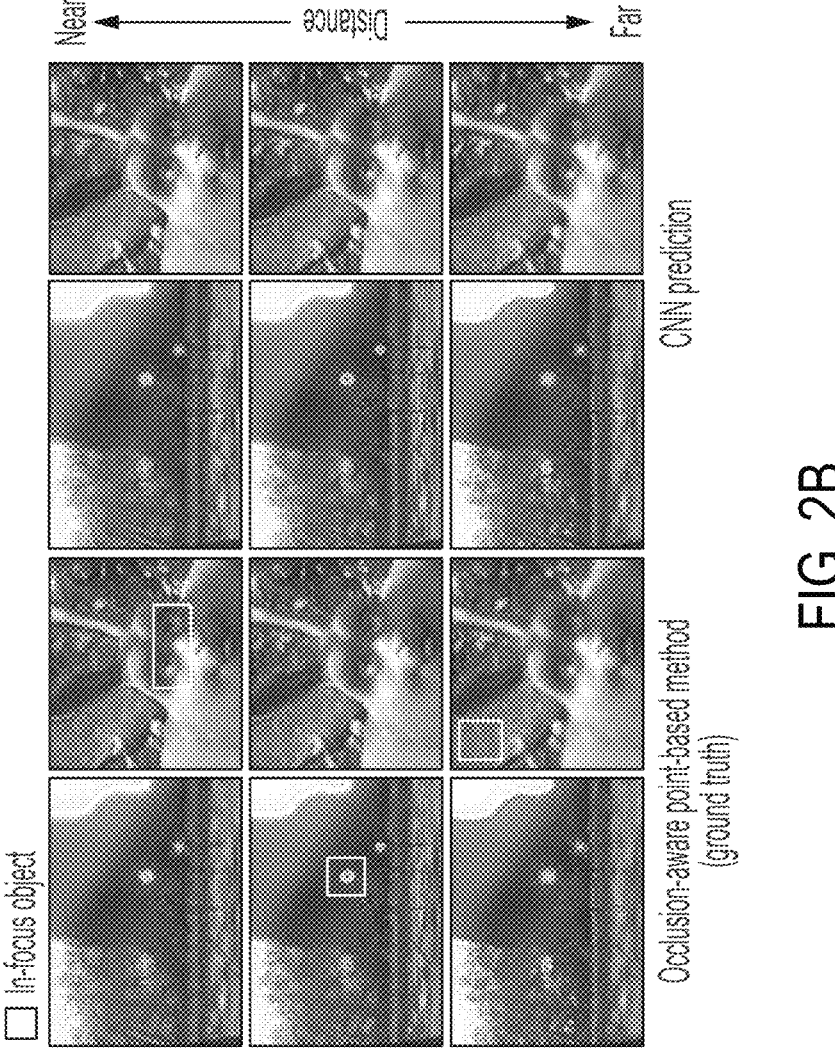
Figure 2C:
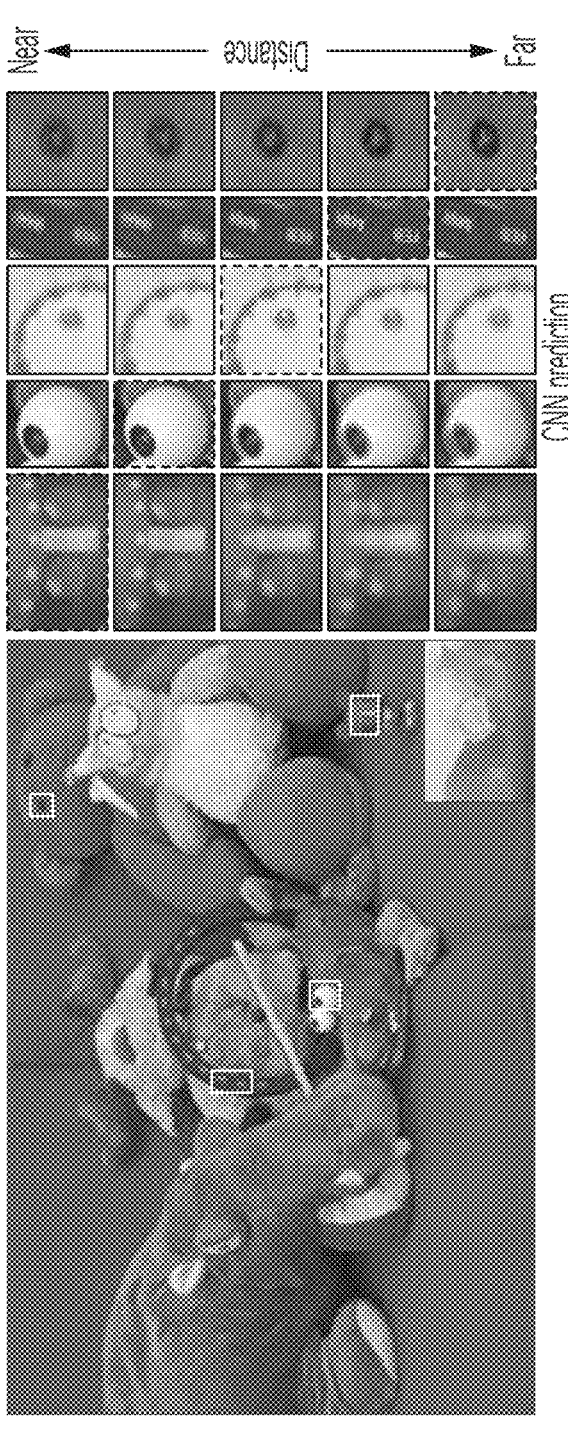
Figure 2D:
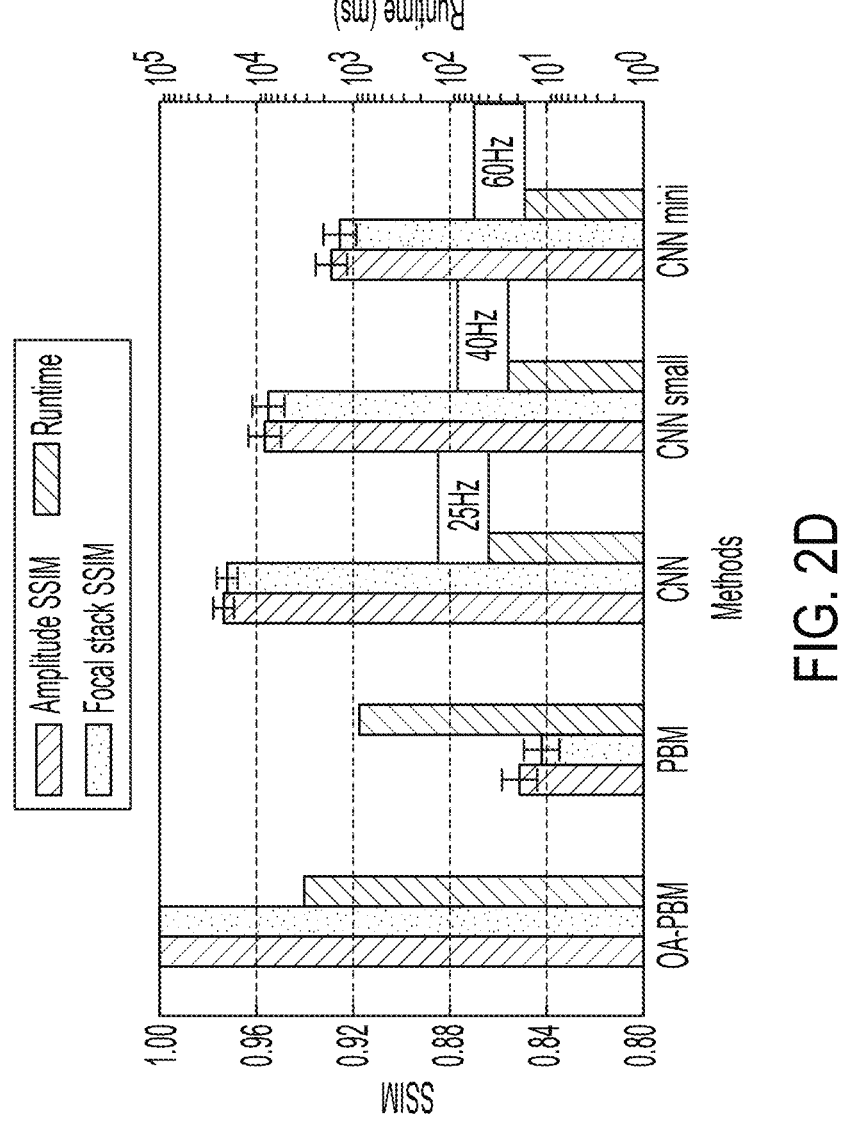
Figure 2E:
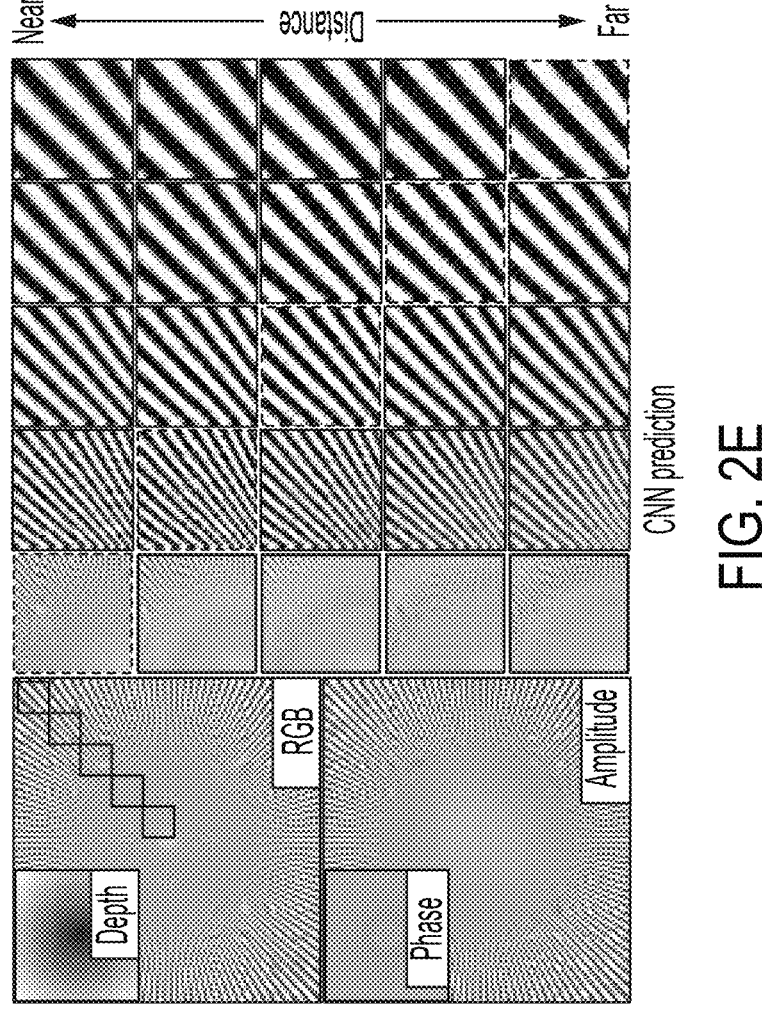
Figure 2F:
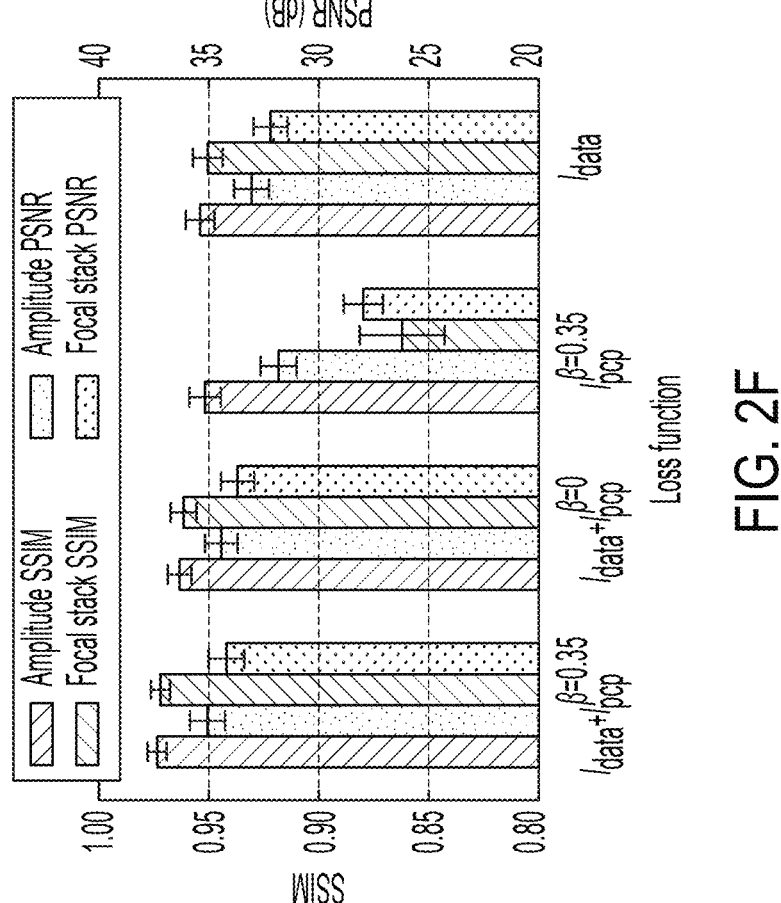
Figure 2G:
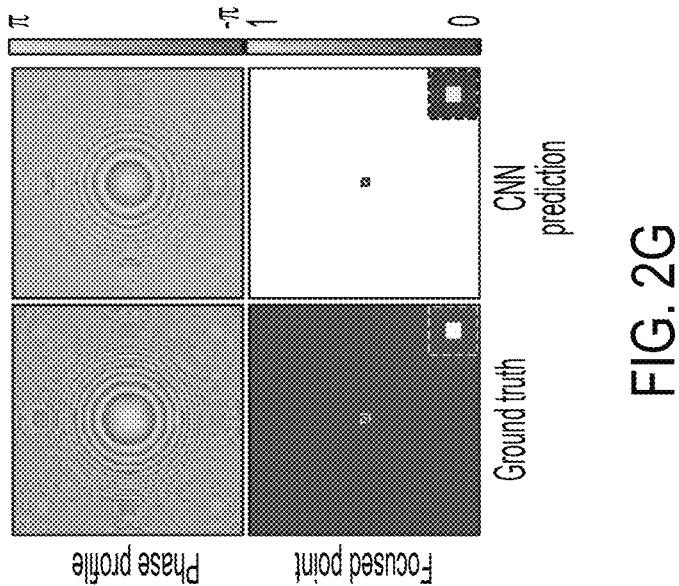

FIGS. 2A-2G are a performance evaluation of the OA-PBM and tensor holography CNN. FIG. 2A is a simulated depth-of-field image refocused from a CNN predicted hologram. The bunny's eye is in focus. The input RGB-D image is from Big Buck Bunny (www.bigbuckbunny.org, Blender Foundation, used under a Creative Commons license). The bottom right inset visualizes the depth image. FIG. 2B is a comparison of focal stacks reconstructed at highlighted regions in FIG. 2A. The CNN prediction is visually similar to the OA-PBM ground truth. FIG. 2C is a simulated depth-of-field image and focal stack (the magnified insets) reconstructed from the CNN predicted hologram of a real-world captured RGB-D image. FIG. 2D is a performance comparison of the PBM, OA-PBM and CNNs with various model capacities. The default CNN model consists of 30 convolution layers and 24 filters per layer, the small and mini models have 15 and 8 convolution layers, respectively. The reduction of convolution layers gracefully degrades the reconstructed image quality. The mini model runs in real time (60 Hz). The error bars are the standard deviation, and SSIM refers to structural similarity index measure. FIG. 2E is a CNN predicted hologram and reconstructed depth-of-field images (the magnified insets) of a star test pattern. Line pairs of varying frequencies are sharply reconstructed at different depths, and the wavelength-dependent light dispersion is accurately reproduced. FIG. 2F is an ablation study of the full loss function (first). The ablation of attention mask (second) dilutes the CNN's attention to out-of-focus features and results in inferior performance. The ablation of data loss (third) removes the regularization of phase information and leads to poor generalization to unseen examples and large focal stack error. The ablation of perceptual loss (fourth) removes the guide of focal stacks and uniformly degrades the performance. The error bars are the standard deviation, and PSNR refers to the peak signal-to-noise ratio. FIG. 2G is a comparison of a ground truth Fresnel zone plate and a CNN prediction (by a model with 30 layers and 120 filters per layer) computed for a 6-mm distant point (propagated for another 20 mm for visualization).

Our CNN was trained on a NVIDIA Tesla V100 GPU (Nvidia Corp., Santa Clara, CA) for 84 hours (see Methods for model parameters and training details). The trained model generalizes well to computer-rendered (FIG. 2A), real-world captured (FIG. 2C) RGB-D inputs, and standard test patterns (FIG. 2E). Compared with the reference OA-PBM holograms, the CNN predictions are both perceptually similar (FIG. 2B) and numerically close (FIGS. 2D and 2F). Evaluated on a single distance-point target, the output from a CNN with sufficient model capacity faithfully approximates a Fresnel zone plate (FIG. 2G), under the low-rank solution space restricted by a set of successively applied 3×3 convolution kernels. When all algorithms are implemented on a GPU with the CNN in NVIDIA TensorRT, and the OA-PBM and PBM in NVIDIA CUDA, the mini CNN achieves more than two orders of magnitude speed-up (FIG. 2D) over the OA-PBM and runs in real time (60 Hz) on a single NVIDIA Titan RTX GPU. As our end-to-end learning pipeline completely avoids logically complex ray-triangle intersection operations, it runs efficiently on low-power ASICs for accelerated CNN inference. Our model has an extremely low memory footprint of only 617 KB at Float32 precision and 315 KB at Float16 precision. At Int8 precision, it runs at 2 Hz on a single Google Edge TPU. All reported runtime performance is evaluated on inputs with a resolution of 1,920×1,080 pixels.

Display Prototype of Tensor Holography

Figure 3A:
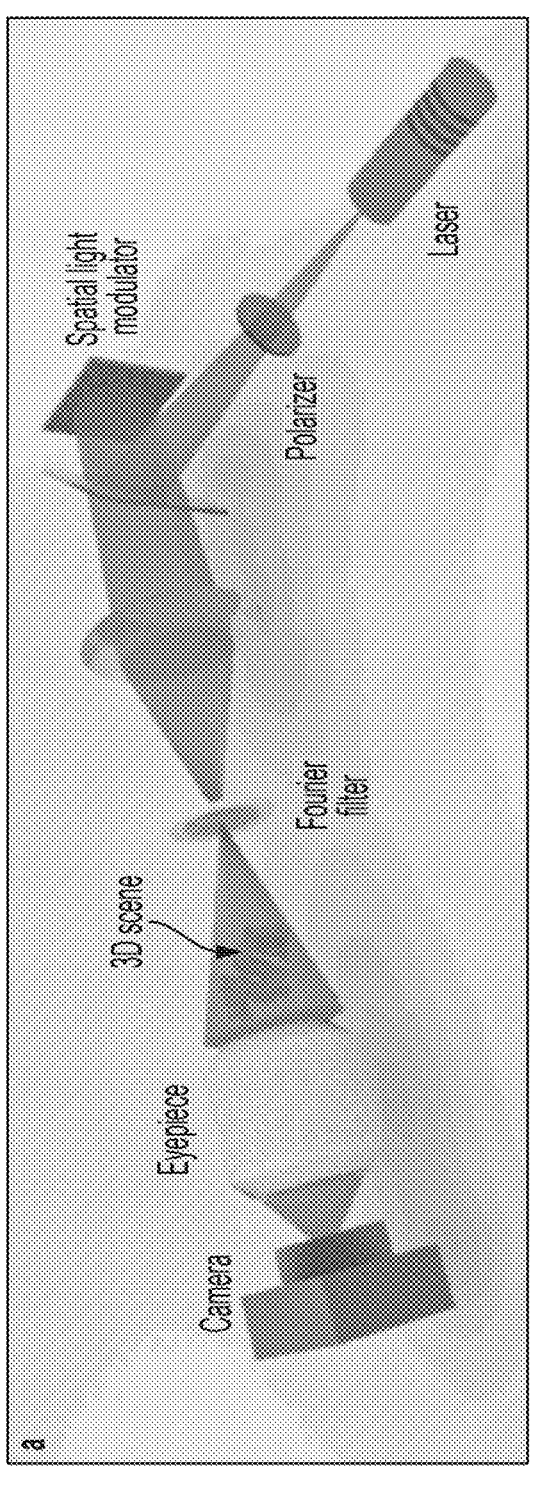
FIGS. 3A-3D are an experimental demonstration of 2D and 3D holographic projection.
Figure 3B:
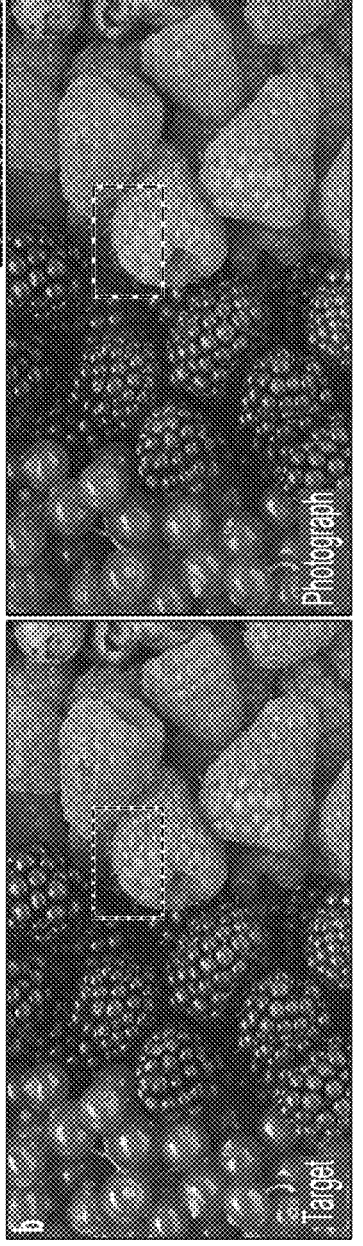
Figure 3C:
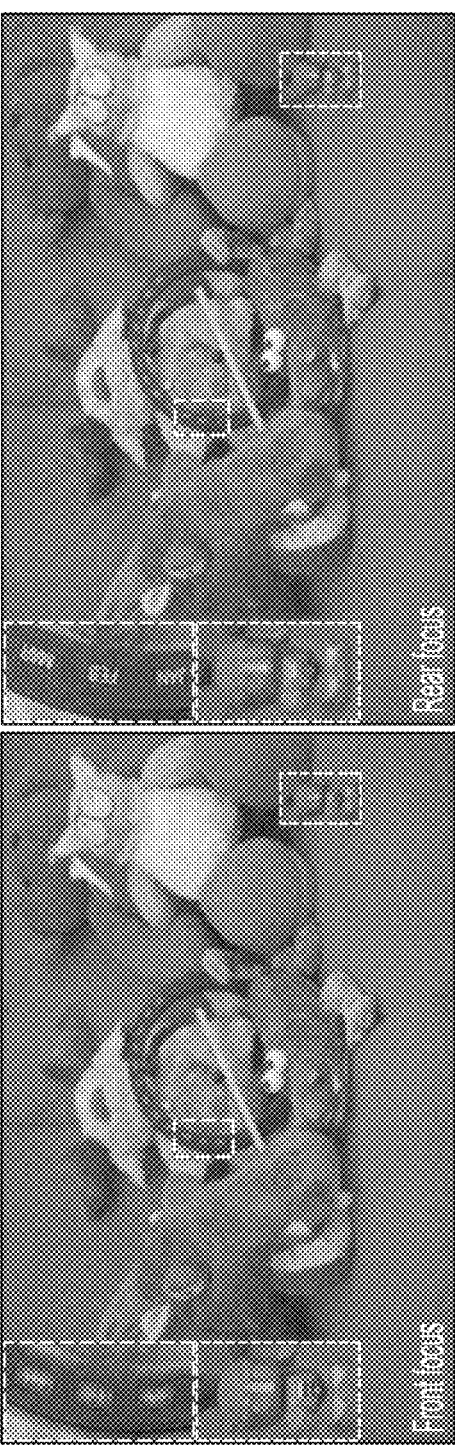
Figure 3D:
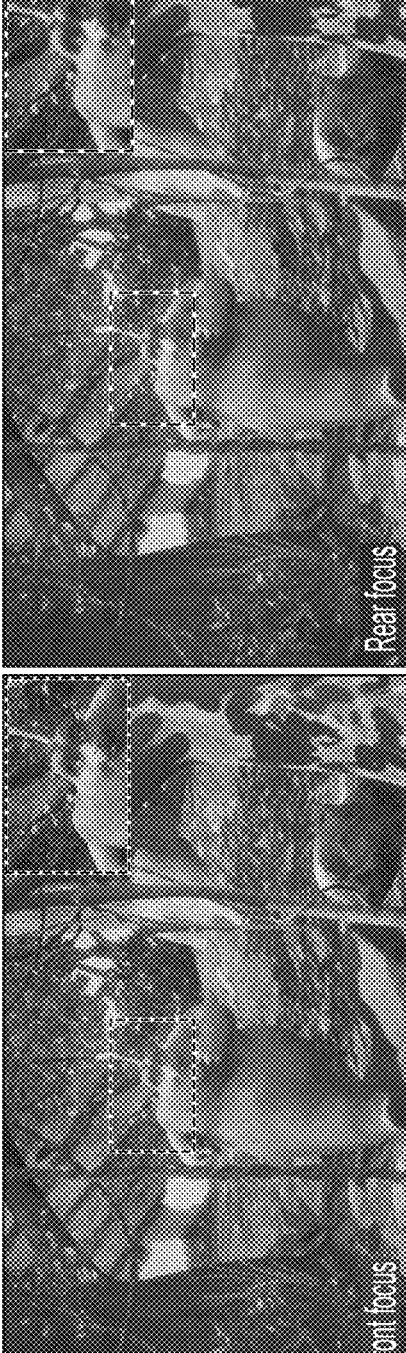

FIGS. 3A-3D are an experimental demonstration of 2D and 3D holographic projection. FIG. 3A is a scheme of our phase-only holographic display prototype. Only the green laser is visualized. FIG. 3B shows on the left: a flat (2D) target image for testing the spatial resolution of our prototype; on the right: A photograph of the CNN predicted hologram (encoded with anti-aliasing double phase method) displayed on our prototype. The insets on the top right show the magnified bounding boxes. FIG. 3C shows photographs of our prototype presenting a real-world captured 3D couch scene in FIG. 2C. The left photograph is focused on the mouse toy and the right photograph is focused on the perpetual desk calendar. FIG. 3D shows photographs of our prototype presenting a computer-rendered 3D Big Buck Bunny scene in FIG. 2A. The left photograph is focused on the bunny's eye and the right photograph is focused on the background tree leaves.

We have built a phase-only holographic display prototype (see FIG. 3A for a scheme and FIG. 5 for a version of the physical setup) to experimentally validate our CNN. The prototype uses a HOLOEYE PLUTO-2-VIS-014 reflective SLM with a resolution of 1,920×1,080 pixels and a pixel pitch of 8 μm (see below for prototype details). The color image is obtained field sequentially. To encode a CNN-predicted complex hologram into a phase-only hologram, we introduce an anti-aliasing double phase method (AA-DPM), which produces artefact-free 3D images around high-frequency objects and occlusion boundaries (see below for algorithm details and comparison with the original double phase method (DPM)). In FIG. 3B we demonstrate speckle-free, high-resolution and high-contrast 2D projection, where the fluff of the berries can be found to be sharply reconstructed. In FIGS. 3C and 3D we show 3D holograms photographed for the couch scene and the Big Buck Bunny scene with focus set to the front and rear objects.

Methods

OA-PBM

The OA-PBM assumes a general holographic display setting, where the RGB-D image is rendered with perspective projection and the hologram is illuminated by a point source of light co-located with the camera. This includes the support of collimated illumination, a special case where the point light source is located at infinity and the rendering projection is orthographic. During ray casting, every object point defined by the RGB-D image produces a subhologram at the hologram plane. The maximum spatial extent of a subhologram is dictated by the grating equation $$\Delta p(\sin \theta_m - \sin \theta_i) = \pm \lambda \tag{5}$$

where $\Delta p$ is the grating pitch (twice the SLM pixel pitch), $\theta_i$ is the light incidence angle from the point light source to a hologram pixel, $\theta_m$ is the maximum outgoing angle from the same hologram pixel and $\lambda$ is the wavelength. Let $o \in R^3$ be (the location of) an object point defined by the RGB-D image, $S_o$ be the set of SLM pixels within the extent of the subhologram of o, $p \in R^3$ be (the location of) an SLM pixel in $S_o$, $l \in R^3$ be (the location of) the point light source and $S_{slm}$ be the set of all SLM pixels, the wavefront contributed from o to p under the illumination of l is given by $$h_0(p) = \frac{a}{w_0} e^{i\left(\phi_0 + \frac{2\pi(\|p-o\|_2 + \|p-l\|_2)}{\lambda}\right)}, \tag{6}$$

where a is the amplitude associated with o, $w_o = a^2/\Sigma_{j \in S_{slm}}$ [$j \in S_o$] is an amplitude attenuation factor for energy conversation (where j is a dummy variable that denotes an SLM pixel in $S_o$ and [·] denotes Iverson bracket) and $\phi_o$ is the initial phase associated with o. The initialization of $\phi_o$ uses the position-dependent formula by Maimone et al. as published in Maimone, A., Georgiou, A., & Kollin, J. S.; *Holographic near-eye displays for virtual and augmented reality; ACM Trans. Graph* 36, 85:1-85:16 (2017) (hereinafter "Maimone"), instead of random initialization to allow different Fresnel zone kernels to cancel out at the hologram plane and achieve a smooth phase profile. We emphasize that this deterministic phase initialization method is critical to the success of CNN training, as it ensures the complex holograms generated for the entire dataset are statistically consistent and bear repetitive features that can be learned by a CNN.

The OA-PBM models occlusion by multiplying $h_o(p)$ with a binary visibility mask $v_o(p)$. The value of $v_o(p)$ is set to 0 if ray $\overrightarrow{op}$ intersects the piece-wise linear surface (triangular surface mesh) built from the RGB-D image. In practice, this ray-triangle intersection test can be accelerated with space tracing by only testing the set of triangles $Q_{\overrightarrow{op}}$ that may lie on the path of $\overrightarrow{op}$. Let $p_{oi}^{\rightarrow}$ be the SLM pixel intersecting of (pixel at the subhologram centre of o), the set $Q_{\overrightarrow{op}}$ only consists of triangles whose vertices' x-y coordinate indices are on the path of line segment $\overline{pp_{oi}^{\rightarrow}}$, and $$v_o(p) = \neg \left[ \bigvee_{q \in Q_{\overrightarrow{op}}} \overrightarrow{op} \text{ intersects } q \right] \tag{7}$$

where q is a dummy variable that denotes a triangle on the path of $Q_{\overrightarrow{op}}$.

Finally, the target hologram $H_{target}$ is obtained by summing subholograms contributed from all object points $$H_{target}(p) = \sum_{j \in S_p} v_j(p) h_j(p) \tag{8}$$

where $S_p$ is the set of object points whose subholograms are defined at p. Compared with the PBM, the OA-PBM substantially reduces background leakage. It is important to note that the OA-PBM is still a first-order approximation of the Fresnel diffraction, and the hologram quality could be further improved by modelling wavefronts from secondary point sources stimulated at the occlusion boundaries based on the Huygens-Fresnel principle. While theoretically possible, in practice the number of triggered rays grows exponentially with respect to the number of occlusions, and both the computation and memory cost becomes intractable for complex scenes and provides only minor improvement.

Random Scene Generator

The random scene generator is implemented using the NVIDIA OptiX-ray-tracing library with the NVIDIA AI-Accelerated denoiser turned on to maximize customizability and performance. During the construction of a scene, we limit the random scaling of mesh such that the longest side of the mesh's bounding box falls within 0.1 times to 0.35 times the screen space height. This prevents a single mesh from being negligibly small or overwhelmingly large. We also distribute meshes according to equation (1) to produce a statistically uniform pixel depth distribution in the rendered depth image. To show the derivation of the probability density function $f(z)$, we start from an elementary case where only a single pixel is to be rendered. Let a series of mutually independent and identically distributed random variables $z_1$, $z_2$, $z_{C'}$ denote the depths of all C' meshes in the camera's line of sight. The measured depth of this pixel $z_d$ is dictated by the closest mesh to the camera, namely $z_d$=min $\{z_1, z_2, \ldots, z_{C'}\}$. For any $z \in [z_{near}, z_{far}]$ $$z_d \geq z \Leftrightarrow \min\{z_1, z_2, \ldots, z_{C'}\} \geq z \Leftrightarrow \bigwedge_{i=1}^{C'} z_i \geq z \quad (9)$$

where i is a dummy variable that iterates from 1 to C'. From a probabilistic perspective $$Pr(z_d \geq z) = Pr\left(\bigwedge_{i=1}^{C'} z_i \geq z\right) = \prod_{i=1}^{C'} Pr(z_i \geq z) = (Pr(z_i \geq z))^{C'} \quad (10)$$

When $z_d$ obeys a uniform distribution over $[z_{near}, z_{far}]$, $Pr(z_d \geq z) = (z_{far} - z)/(z_{far} - z_{near})$. Meanwhile, $$Pr(z_i \geq z) = \int_z^{z_{far}} f(t)dt.$$

Thus, equation (10) can be rewritten into the following form for every $z \in [z_{near}, z_{far})$ $$\int_z^{z_{far}} f(t)dt = [Pr(z_d \geq z)]^{\frac{1}{C'}} = \left(\frac{z_{far} - z}{z_{far} - z_{near}}\right)^{\frac{1}{C'}} \quad (11)$$

Differentiating both the leftmost and the rightmost side with respect to z $$f(z) = \frac{1}{C'(z_{far} - z_{near})}\left(\frac{z_{far} - z}{z_{far} - z_{near}}\right)^{\frac{1}{C'}-1} \quad (12)$$

gives a closed-form solution to the PDF associated with $z_1$, $z_2$, \ldots, $z_{C'}$.

Although it is required by definition that $C' \in Z^+$, where $Z^+$ denotes the set of positive integers, equation (12) extrapolates to any positive real number no less than 1 for C'. In practice, calculating an average C' for the entire frame is non-trivial, as meshes of varying shapes and sizes are placed at random x-y positions and scaled stochastically. Nevertheless, C' is typically much smaller than the total number of meshes C, and well modelled by using a scaling factor $\alpha$ such that C'=C/$\alpha$. Equation (1) is thus obtained by applying this equation to equation (12). On the basis of experimentation, we find setting $\alpha$=50 results in a sufficiently statistically uniform pixel depth distribution for $200 \leq C \leq 250$. Extended Data FIG. 2 shows a comparison of the resulting RGB-D images and histograms of pixel depth between our dataset and the DeepFocus dataset. The depth distribution of the DeepFocus dataset is unevenly biased to the front and rear end of the view frustum. This is due to both unoptimized object depth distribution and sparse scene coverage that leads to overly exposed backgrounds.

We generated 4,000 random scenes using the random scene generator. To support application of important image processing and rendering algorithms such as super-resolution and foveation-guided rendering to holography, we rendered holograms for both 8 $\mu$m and 16 $\mu$m pixel pitch SLMs. The image resolution was chosen to be 384×384 pixels and 192×192 pixels, respectively, to match the physical size of the resultant holograms and enable training on commonly available GPUs. We note that as the CNN is fully convolutional, as long as the pixel pitch remains the same, the trained model can be used to infer RGB-D inputs of an arbitrary spatial resolution at test time.

Finally, we acknowledge that an RGB-D image records only the 3D scene perceived from the observer's current viewpoint, and it is not a complete description of the 3D scene with both occluded and non-occluded objects. Therefore, it is not an ideal input for creating holograms that are intended to remain static, but being viewed by an untracked viewer for motion parallax under large baseline movement or simultaneously by multiple persons. However, with real-time performance first enabled by our CNN on RGB-D input, this limitation is not a concern for interactive applications and particularly with eye position tracked, as new holograms can be computed on-demand on the basis of the updated scene, viewpoint or user input to provide an experience as though the volumetric 3D scene was simultaneously reconstructed. This is especially true for virtual and augmented reality headsets, where six-degrees-of-freedom positional tracking has become omnipresent, and we can always deliver the correct viewpoint of a complex 3D scene for a moving user by updating the holograms to reflect the change of view. However, the low rendering cost and memory overhead of RGB-D representation is a key attribute that enables practical real-time applications. Beyond computer graphics, the RGB-D image is readily available with low-cost RGB-D sensors such as Microsoft Kinect (Microsoft Corp., Redmond, WA) or integrated sensors of modern mobile phones. This further facilitates utilization of real-world captured data, whereas high-resolution full 3D scanning of real-world-sized environments is much less accessible and requires specialized high-cost imaging devices. Thus, the RGB-D representation strikes a balance between image quality and practicality for interactive applications.

CNN Model Architecture, Training, Evaluation, and Comparisons

Our network architecture consists of only residual blocks and a skip connection from the input to the penultimate residual block. The architecture is similar to DeepFocus, a fully convolutional neural network designed for synthesizing image content for varifocal, multifocal and light field head-mounted displays. Yet, our architecture ablates its volume-preserving interleaving and de-interleaving layer. The interleaving layer reduces the spatial dimension of an input tensor through rearranging non-overlapped spatial blocks into the depth channel, and the de-interleaving layer reverts the operation. A high interleaving rate reduces the network capacity and trades lower image quality for faster runtime. In practice, we compared three different network miniaturization methods: (1) reduce the number of convolution layers; (2) use a high interleaving rate; and (3) reduce the number of filters per convolution layer. At equal runtime, approach 1 (using fewer convolution layers) produces the highest image quality for our task; approach 3 results in the lowest image quality because the CNN model contains the lowest number of filters (240 filters for approach 3 compared with 360 or 1,440 filters for approaches 1 and 2, respectively), while approach 2 is inferior to approach 1 mainly because neighbouring pixels are scattered across channels, making a reasoning of their interactions much more difficult. This is particularly harmful when the CNN has to learn how different Fresnel zone kernels should cancel out to produce a smooth phase distribution. Given this observation, we ablate the interleaving and de-interleaving layers in favour of both performance and model simplicity.

All convolution layers in our network use 3×3 convolution filters. The number of minimally required convolution layers depends on the maximal spatial extent of the sub-hologram. Quantitatively, successive application of x convolution layers results an effective $3+(x-1)\times2$ convolution. Solving for the maximum subhologram width $W=3+(x-1)\times2$ yields $[(W-3)]/2+1$ minimally required convolution layers.

In FIGS. 4A-4C, we demonstrate the calculation of the midpoint hologram, which reduces the effective maximum subhologram size through relocating the hologram plane. First, the holographic display magnified by the point light source is unmagnified to its collimated illumination counterpart. The original view frustum V and the unmagnified view frustum V' are related by the thin-lens equation (1)/ $d'=1/d+1/f$, where $f$, d and d' are the distance between the point light source and the hologram, the hologram and a point in V, and the hologram and the same point mapped to V' respectively. Then, the target hologram is propagated to the centre of the unmagnified view frustum V' following equation (6). As the resulting midpoint hologram depends on only the thickness of the 3D volume, it leads to a substantial reduction of W if the relative distance between the hologram plane and the 3D volume is far. For example, in our rendering setting, we assume a 30-mm eyepiece magnifies a collimated frustum between 24 mm and 30 mm away, effectively resulting in a magnified frustum that covers from 0.15 m to infinity for an observer that is one focal length behind the eyepiece. If the hologram plane is co-located with the eyepiece (30 mm to the far clipping plane), using the midpoint to substitute the target hologram reduces the maximum subhologram width by ten times from 300 pixels to 30 pixels, resulting in 15 convolution layers as minimally required. In practice, we find using fewer convolution layers than the theoretical minimum only moderately degrades the image quality (FIG. 2, part d). This is because the use of the phase initialization of Maimone allows the target phase pattern to be mostly occupied by low-frequency features and absent from Fresnel-zone-plate-like high-frequency patterns. Thus, even with reduced effective convolution kernel size, such features are still sufficiently easy to reproduce.

We reiterate that the midpoint hologram is an application of the wavefront recording plane (WRP) as a pre-processing step. In a physically based method, the WRP is introduced as an intermediate ray-sampling plane placed either inside or outside the point cloud to reduce the wave propagation distance and thus the subhologram size during Fresnel diffraction integration. Application of multiple WRPs was also combined with the use of precomputed propagation kernels to further accelerate the runtime at the price of sacrificing accurate per-pixel focal control. For fairness, the GPU runtimes reported for the OA-PBM and PBM baseline in FIG. 2D have been accelerated by putting the WRP to a plane that corresponds to the centre of the collimated frustum.

Our CNN is trained on a 384×384-pixel RGB-D image and hologram pairs. We use a batch size of 2, ReLu activation, attention scale $\beta=0.35$, number of depth bins T=200, number of dynamic focal stack $k_{fix}=15$ and $k_{float}=5$ for the training. We train the CNN for 1,000 epochs using the Adam[6] optimizer at a constant learning rate of $1\times10^{-4}$. The dataset is partitioned into 3,800, 100 and 100 samples for training, testing and validation. We compared the performance of our CNN with U-Net and Dilated-Net, both of which are popular CNN architectures for image synthesis tasks. When the capacity of the other two models is configured for the same inference time, our network achieves the highest performance. The superiority comes from the more consistent and repetitive architecture of our CNN. Specifically, it avoids the use of pooling and transposed convolution layers to contract and expand the spatial dimension of intermediate tensors, thus the high-frequency features of Fresnel zone kernels are more easily constructed and preserved during forward propagation.

AA-DPM

The double phase method encodes an amplitude-normalized complex hologram $Ae^{i\Phi}\in C^{M\times N}$ ($0\le A\le1$) into a sum of two phase-only holograms at half of the normalized maximum amplitude:

$$Ae^{i\Phi}=0.5e^{i(\Phi-cos^{-1}A)}+0.5e^{i(\Phi+cos^{-1}A)} \qquad (13)$$

There are many different methods to merge decomposed two phase-only holograms into a single phase-only hologram. The original DPM uses a checkerboard mask to select interleaving phase values from the two phase-only holograms. Maimone et al. first discard every other pixel of the input complex hologram along one spatial axis and then arrange the decomposed two phase values along the same axis in a checkerboard pattern. The latter method produces visually comparable results, but reduces the complexity of the hologram calculation by half via avoiding calculation at unused locations. Nevertheless, for complex 3D scenes, they produce severe artefacts around high-frequency objects and occlusion boundaries. This is because the high-frequency phase alterations presented at these regions become undersampled due to the interleaving sampling pattern and disposal of every other pixel. Although these artefacts can be partially suppressed by closing the aperture and cutting the high-frequency signal in the Fourier domain, this leads to substantial blurring. Although sampling is inevitable, we borrow techniques employed in traditional image subsampling to holographic content and introduce an AA-DPM. Specifically, we first convolve the complex hologram by a Gaussian kernel $G_{W_G}(\sigma)$ to obtain a low-pass-filtered complex hologram $\overline{A}e^{i\overline{\Phi}}\in C^{M\times N}$:

$$\overline{A}e^{i\overline{\Phi}}=Ae^{i\Phi}*G_{W_G}(\sigma) \qquad (14)$$

where * denotes a 2D convolution operator, $W_G$ is the width of the 2D Gaussian kernel and $\sigma$ is the standard deviation of the Gaussian distribution. In practice, we find setting $W_G$ no greater than 5 and $\sigma$ between 0.5 and 1.0 is generally sufficient for both the rendered and captured 3D scenes used in this paper, while the exact $\sigma$ can be fine-tuned based on the image statistics of content. For flat 2D images, $\sigma$ can be further tuned down to achieve sharper results. The slightly blurred $\overline{A}e^{i\overline{\Phi}}$ avoids aliasing during sampling and allows the Fourier filter (aperture) to be opened wide, thus resulting in a sharp and artefact-free 3D image. We also add a global phase offset to $\overline{A}e^{i\overline{\Phi}}$ to center the mean phase around half of the full phase-shift range of the SLM ($3\pi$ in our case). This avoids phase wrapping and results in smooth phase distribution[2]. Finally, let $P_1\in C^{M\times N}$ and $P_2\in C^{M\times N}$ be the two phase-only holograms decomposed from $\overline{A}e^{i\phi}$ using equation (13), the final phase-only hologram $P \in C^{M \times N}$ is calculated by arranging $P_1$ and $P_2$ in a checkerboard pattern $$P(m, n) = \begin{cases} P_1(m, n) \text{ if } m + n \text{ is odd} \\ P_2(m, n) \text{ if } m + n \text{ is even} \end{cases} \quad (15)$$

$$(-M/2 \le m \le M/2 - 1, \ -N/2 \le n \le N/2 - 1).$$

This alternating sampling pattern yields a high-frequency, phase-only hologram, which can diffract light as effectively as a random hologram, but without producing speckle noise. Comparing the depth-of-field images simulated for the AA-DPM and DPM, the AA-DPM produces artefact-free images in regions with high-spatial-frequency details and around occlusion boundaries. The AA-DPM can be efficiently implemented on a GPU as two gather operations, which takes less than 1 ms to convert a 1,920×1,080-pixel complex hologram on a single NVIDIA TITAN RTX GPU.

Holographic Display Prototype

Figure 5:
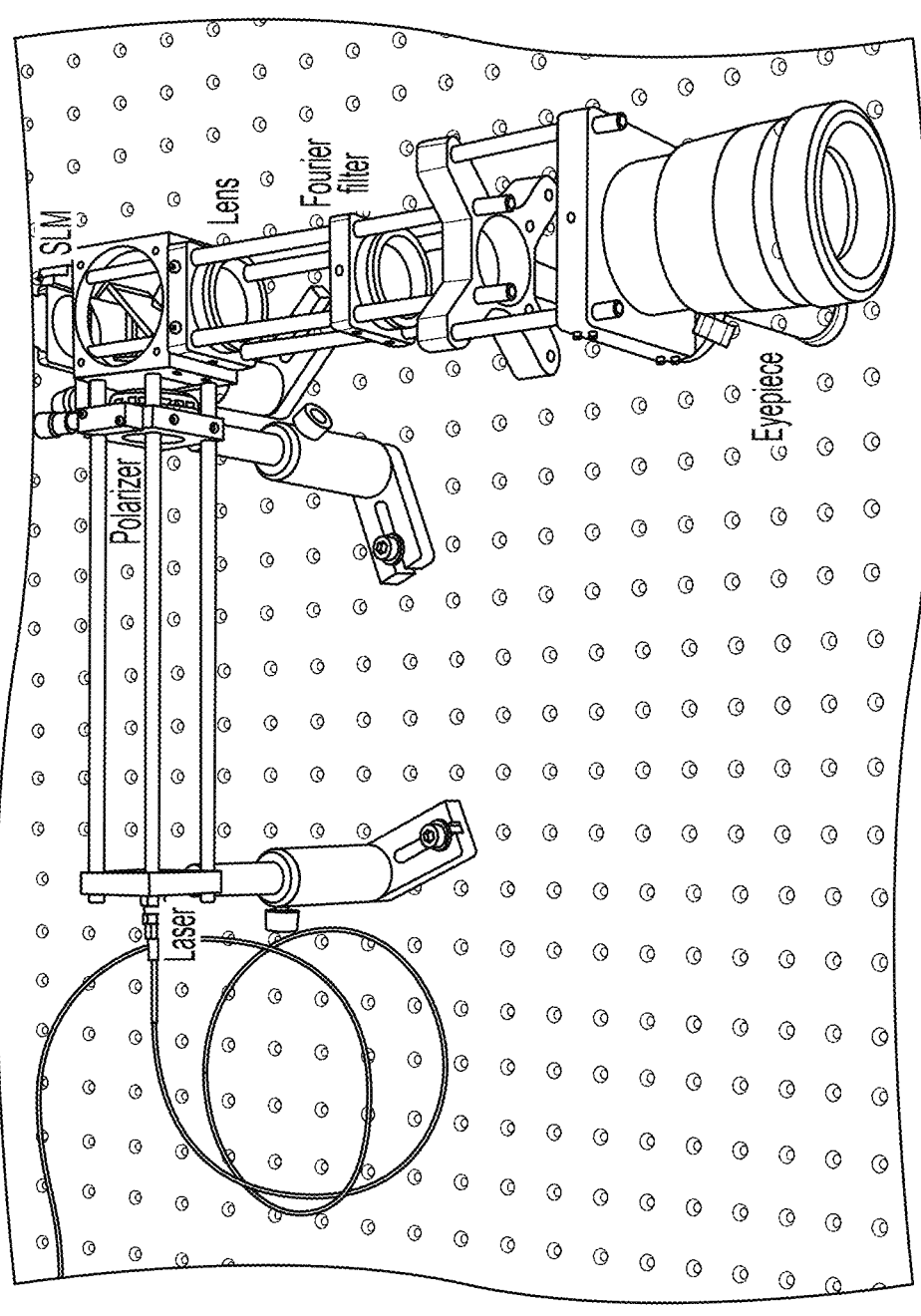
FIG. 5 is a view of a holographic display as used in embodiments of the present invention.

FIG. 5 is a view of a holographic display prototype as used in embodiments of the present invention. Our display prototype uses a Fisba RGBeam fibre-coupled laser and a single HOLOEYE PLUTO-2-VIS-014 (HOLOEYE Photonics AG, Berlin, Germany) liquid-crystal-on-silicon reflective phase-only SLM with a resolution of 1,920×1,080 pixels and a pitch of 8 μm. The laser consists of three precisely aligned diodes operating at 450 nm, 520 nm and 638 nm, and provides per-diode power control. The prototype is constructed and aligned using a Thorlabs (Thorlabs, Newton, NJ) 30-mm and 60-mm cage system and components. The fibre-coupled laser is mounted using a ferrule connector/physical contact adaptor, placed at a distance that results in an ideal diverging beam (adjustable based on the desired field of view) and linearly polarized to the x axis (horizontal) to match the incident polarization required by the SLM. A plate beam splitter mounted on a 30-mm cage cube platform splits the beam and directs it towards the SLM. After SLM modulation, the reconstructed aerial 3D image is imaged by an achromatic doublet with a 60-mm focal length. An aperture stop is placed about one focal length behind the doublet (the Fourier plane) to block higher-order diffractions. The radius of its opening is set to match the extent of the blue beam's first-order diffraction. We emphasize that this should be the maximum radius as opening it further includes second-order diffraction from the blue beam. A 30-mm to 60-mm cage plate adaptor is then used to widen the optical path and an eyepiece is mounted to create the final retinal image.

In this work, a Sony A7 Mark III (Sony Group Corp., Tokyo, Japan) mirrorless camera with a resolution of 6,000× 4,000 pixels and a Sony 16-35 mm f/2.8 GM lens is paired to photograph and record video of the display (except Supplementary Video 4). Colour reconstruction is obtained field sequentially with a maximum frame rate of 20 Hz that is limited by the SLM's 60-Hz refresh rate. A Labjack (LabJack Corp., Lakewood, CO) U3 USB DAQ is deployed to send field sequential signals and synchronize the display of colour-matched phase-only holograms. Each hologram is quantized to 8 bits to match the bit depth of the SLM. For the results shown in FIG. 3, part b, we used a Meade Series 5000 21-mm MWA eyepiece (Meade Instruments Corp., Irvine, CA). For the results shown in FIG. 3, parts c and d, we used an Explore Scientific 32-mm eyepiece (Explore Scientific, Springdale, AR). The photograph was captured by exposing each colour channel for 1 s. The long exposure time improves the signal-to-noise ratio and colour accuracy. No post sharpening, denoising or despeckling was applied to the captured photographs. Finally, our setup can be further miniaturized to an eyeglass form factor as demonstrated by Maimone.

Figure 6:
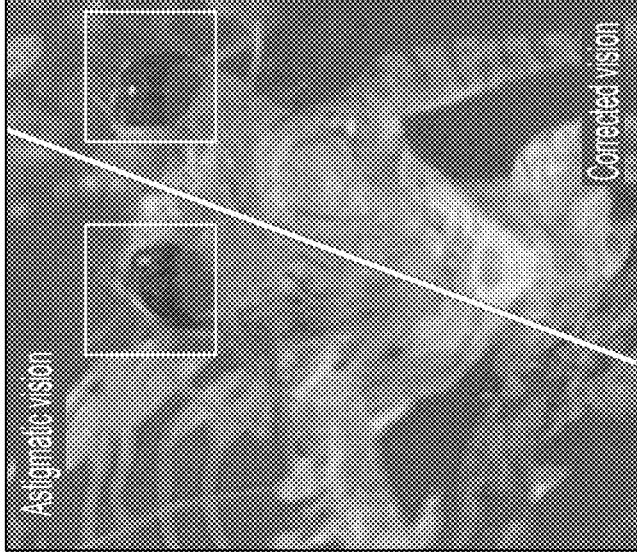
FIG. 6 is a representation of a 3D phase-only hologram.
Figure 6:
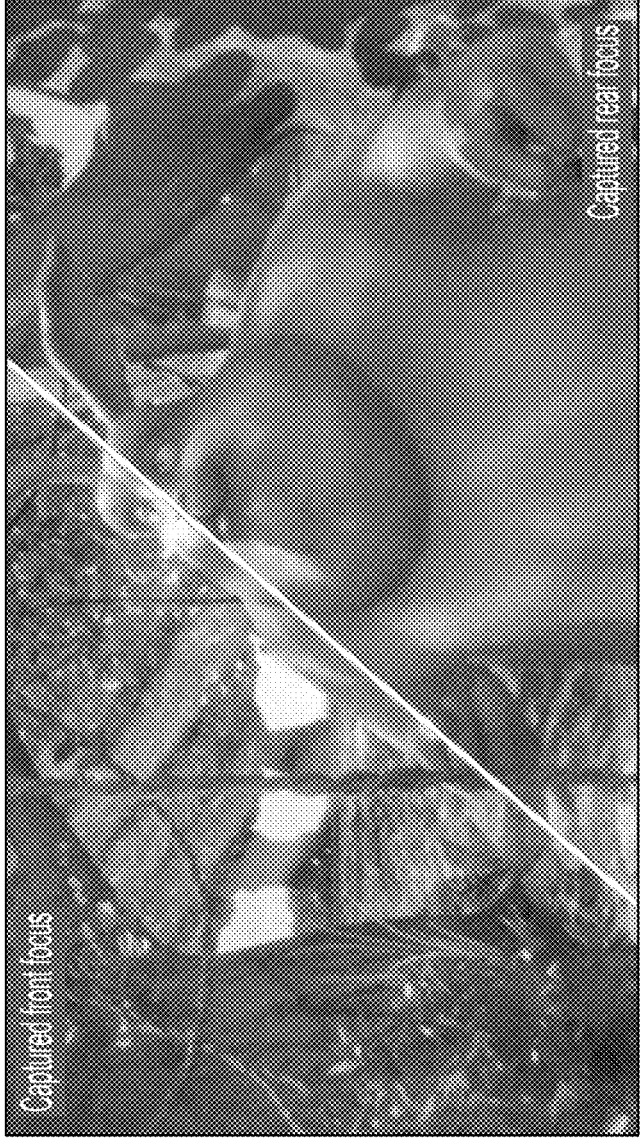

Second Embodiment—Neural Network-Enhanced Layered Depth Image Holographic Representation FIG. 6 shows on the left photographs of our display prototype showing a true 3D phase-only hologram in accordance with the second embodiment. The hologram is predicted end-to-end by our CNN in real-time on an NVIDIA TITAN RTX. The hologram produces natural defocus blur and physically accurate occlusions. On the right, FIG. 6 shows photographs of our prototype with astigmatic vision and vision correction applied. We introduce a suite of calibration procedures to experimentally obtain high-quality 3D holograms and enable aberration correction in the CNN training workflow.

Before we discuss the second embodiment in detail, we first analyze the common artifacts produced by different algorithms during occlusion modeling. Then, we show how the LDI representation in accordance with the second embodiment empowers OA-LBM with an arbitrarily dense layer partition and removal of the aforementioned artifacts.

Occlusion Modeling Related Artifacts

Occlusion modeling for 3D hologram has been approached at the scene representation stage and the hologram computation stage. At the scene presentation stage, instead of feeding the complete scene description (i.e. point cloud or meshes), rasterized or ray-traced images (with depth maps) that only record the frontmost surfaces visible to a viewer are used to avoid depth testing during hologram computation. More advanced inputs such as multi-view images and light fields are used to jointly model occlusions and view-dependent effects. Occlusion detection at the hologram computation stage are typically done using ray casting for point-based methods and silhouettes for FFT-based approaches. The former discards wavefronts carried by occluded rays and can be implemented by casting rays from points to the hologram plane or from hologram pixels to the scene. The latter slices the 3D volume into multiple planes and scene primitives projected to each plane creates a silhouette. FFT-based free-space propagation (i.e. the angular spectrum method) is then performed from the furthest layer or polygon to the frontmost in a layer-by-layer fashion, and inside a silhouette, occluded wavefronts are replaced by wavefronts from the current layer.

To exam the effectiveness of different approaches, we created a simple test scene consisting of two vertical bars with the front bar perfectly occluding the lower half of the rear bar. We assign different amplitudes to the front and rear bars and replicate the pair once along the horizontal axis for visualization. The complete scene can be represented by an LDI with two layers, one for the front bar and the top half of the rear bar, the other for the bottom half of the rear bar. The rasterized scene is represented by the LDI's first layer. We tested 6 pairs of input and CGH algorithm:

(1) No occlusion: apply naive point-based method or layer-based method to the complete scene.

(2) Occlusion only from input: apply naive point-based method or layer-based method to the rasterized scene.

(3) Geometric occlusion detection (computation): apply occlusion-aware point-based method to the complete scene.

(4) Geometric occlusion detection (input+computation): apply occlusion-aware point-based method to the rasterized scene.

(5) Wave-based occlusion detection (computation): apply occlusion-aware layer-based method to the complete scene.

(6) Wave-based occlusion detection (input+computation): apply occlusion-aware layer-based method to the rasterized scene.

After analyzing the results, we conclude there are 4 types of artifacts:

(1) Leakage of wavefront from occluded points.

(2) Leakage of wavefront from visible points.

(3) Loss of wavefront from occluded points.

(4) Inaccurate wavefront due to geometric optics modeling.

From the results, modeling occlusion at the scene representation stage (setting 2) can avoid type 1 artifacts and reduce input data size. On top of that, applying either type of occlusion detection at the computation stage (setting 4 or 6) removes type 2 artifacts. If occlusion detection is wave-based (setting 6), type 4 artifacts are also removed, resulting in an artifact-free foreground reproduction. However, type 3 artifacts are always present (for setting 2, 4, 6) due to the loss of occluded points and their wavefronts. This leads to amplitude attenuation at the background side of the occlusion boundaries. Providing the complete scene and applying wave-based occlusion detection (setting 5) avoid all types of artifacts, but incur a higher data/computational cost.

Combining Layered Depth Images and OA-LBM

From the previous experiment, we conclude a list of candidate representations that fully or largely preserve the complete scene information. These candidates are: 1) general point clouds; 2) meshes; 3) voxel grids; 4) light fields; 5) layered depth images. When choosing the most appropriate representation, we begin by ruling out the first two candidates. This is because we will eventually replace physical simulation by a CNN proxy, while point clouds and meshes are less suitable for training image synthesis CNNs due to their scene-dependent input feature length. We note that there exists many CNN architectures for point clouds and meshes, however, they are mostly designed for shape classification, 3D detection/tracking, and part segmentation tasks by outputting a per-point or per-vertex label. In addition, performing convolution on unordered point clouds requires a CNN to query neighbors of each point, which may not lie continuously in the memory and could incur a considerable number of random memory accesses and slow down the runtime.

The voxel grid is in theory a lossless representation compared to the rest two (if the LDI is not exhaustively rendered), and 3D convolution kernels can directly incorporate information along the depth axis. However, a dense voxel grid is data inefficient and its 3D structure places a direct trade-off between spatial and depth resolution. The memory of existing consumer-grade GPUs can only support resolutions below 256×256×256 for popular 3D CNNs such as VoxNet, 3D ShapeNet, or 3D U-Net. Sparse grids can alleviate the memory consumption, but non-continuous memory accesses will also slow down the runtime. In contrast, light fields have more implicit trade-offs. If light fields pixels are treated as points and point-based method is applied, duplication detection needs to be performed because different views can record one point multiple times. One can theoretically avoid duplication detection by only integrating the point's contribution within the angular sampling interval. However, if slight numerical errors are present across the location coordinates saved with different point copies, the phase initialization by Maimone, which produces a smooth phase profile will be out of phase and fail. On the other hand, if light field pixels are treated as rays and each elemental image is converted to holographic stereograms using FFT, the quality of the hologram will be proportional to the angular sampling rate. This places direct trade-off between rendering/memory cost on input preparation and hologram quality. In the future, when the SLM pixel pitch becomes smaller, this problem will be more prominent due to an increased maximum diffraction angle.

The Layered Depth Image (LDI) is superior to other volumetric 3D representations (such as dense point cloud, voxel grid, light fields, etc.) at the same spatial resolution for several key reasons. First, it is highly configurable in a way that if only a single layer is rendered, an LDI degenerates to an RGB-D image; if all layers are exhaustively rendered, an LDI encodes the complete scene information Second, an LDI does not record one pixel multiple times regardless of how many layers are rendered, thus no duplication detection is needed. Third, when rendering limited number of layers, an LDI first records occluded pixels with smaller depths. This is a desired behavior as their wavefronts are more likely to reach the hologram plane, and if there is an eye movement the amount of disocclusion is inverse proportional to the distance between the point and the viewer. Finally, since further layers progressively add occluded pixels, it is convenient to set up the training of CNNs that take partial input (the first few layers) to predict holograms computed from more layers.

Despite these advantages, the use of LDI has not been exploited in CGH algorithms in the prior art to our best knowledge. Currently, layer-based methods either discretize a single RGB-D input or use a slab-based rendering scheme (see FIG. 1/X) to directly produce content at each layer. Specifically, for the i-th layer, a view frustum with the near plane at the $(i-1)$-th layer and the far plane at the i-th layer is set up, then the rendered segment is assigned to the i-th layer. This approach does not require rendering depth maps, yet it directly couples the number of rendering passes and produced images with the number of partitioned layers. Under very dense layer partitions, stacking the rendered layers essentially produces a voxel grid. Also, the rendered layers cannot be used in part as this amounts to fully discarded information in certain depth ranges, where the recorded points could be directly visible to the viewer.

Figure 7:
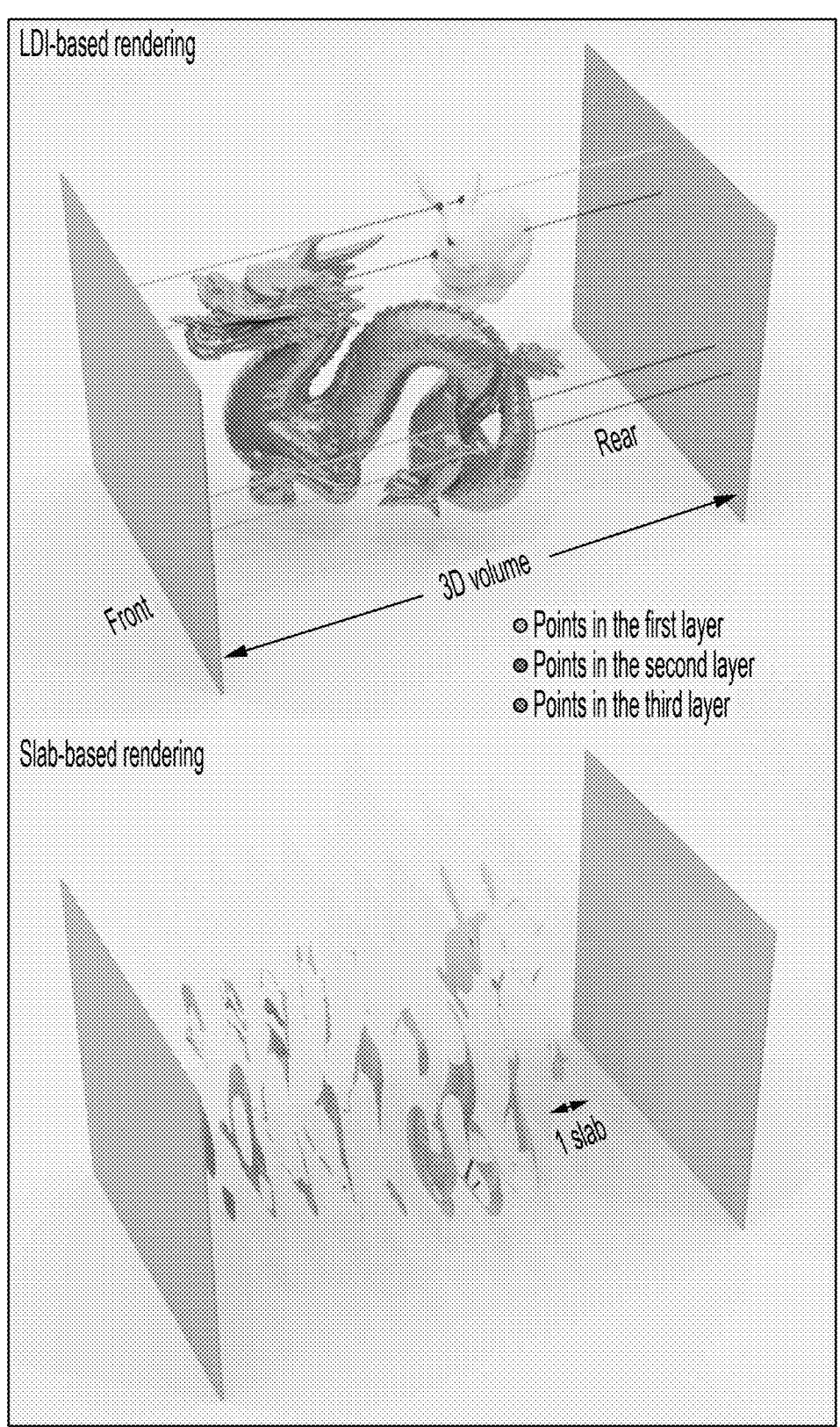
FIG. 7 is a comparison of LDI-based rendering and slab-based rendering.

FIG. 7 shows a comparison of LDI-based rendering and slab-based rendering. In LDI-based rendering, each pixel emits a virtual ray that penetrates through the scene, and the intersection points (with their depths) are recorded on different images based on the order of intersection. In slab-based rendering, the 3D volume is first evenly partitioned into several layers, and rendering is performed for each sub-volume between two neighboring layers to produce the content for the back layer. No depth map needs to be rendered.

Using LDI with OA-LBM, as discussed above, is simple and straightforward. Any non-zero pixels in an LDI defines a valid point before depth quantization. When the number of depth layers N is determined, each point is projected to its nearest plane and a silhouette is set at the same spatial location. Denote the complex amplitude distribution of the N-th layer as $$L_N = A_N \exp\left(-i\frac{2\pi z_N}{\lambda}\right),$$

(16)

where $z_N$ is the depth of the N-th layer, $A_N \in \mathbb{R}^{R_x \times R_y}$ is the amplitude of the layer, $R_x$ and $R_y$ are the spatial resolution along the x and y axis. The exponential term defines the layer's initial phase and we use Maimone's formula to induce a smooth phase profile at the hologram plane. We use the angular spectrum method to propagate the N layer to the N−1 layer $$C_{N-1} = \text{ASM}(L_N, d_l) = \mathcal{F}^{-1}(\mathcal{F}(L_N) \odot \exp(i2\pi d_l \sqrt{\lambda^{-2} - \mu^2 - \upsilon^2})) \quad (17),$$

where $\mu \in \mathbb{R}^{R_x \times R_y}$ and $\upsilon \in \mathbb{R}^{R_x \times R_y}$ are the spatial frequencies along the x and y directions, $d_l$ is the layer thickness, $\odot$ denotes Hadamard element-wise product, $\mathcal{F}$ and $\mathcal{F}^{-1}$ are the 2D Fourier transform and inverse Fourier transform operator. The $C_{N-1}$ is multiplied by the binary silhouette mask at the N−1 layer0, $$M_{N-1}(x, y) = \begin{cases} 0, & A_{N-1}(x, y) > 0 \\ 1, & A_{N-1}(x.y) = 0 \end{cases}, \quad (18)$$

and the complex amplitude at the N−1 layer is updated by adding the masked complex field $$L_{N-1} = C_{N-1} M_{N-1} + L_{N-1} \quad (19),$$

By iterating this process until reaching the first layer, the final hologram is obtained by propagating from the updated first layer to the hologram plane. We emphasize that the final hologram is complex and the approach to obtain a phase-only counterpart is detailed below.

We can add aberration correction modeling for OA-LBM at the sacrifice of computational efficiency. To do so, we repeat the above process for $L_N$ but without adding new layers' contribution during forward propagation by removing the second addition term in Eq. 19. After processing occlusion for all layers in front of $L_N$, we back propagate the resulted wavefront to the location of $L_N$ to obtain an occlusion-processed $L'_N$. We then perform aberration correction in the frequency domain $$L'_{NC} = \mathcal{F}^{-1}(\mathcal{F}(L'_N) \odot \Phi_{z_N}) \quad (20)$$

where $\Phi_{z_N} \in \mathbb{C}^{R_x \times R_y}$ is a depth-dependent aberration correction kernel in the Fourier space. We detail the process to obtain $\Phi_{z_N}$ and how to further extend the algorithm to model depth-dependent spatially-varying aberration correction below. Finally, $L'_{N_C}$ is propagated to the target hologram plane and integrated with aberration corrected layers from other depths that are calculated in the same manner. Because the above process has to be performed separately for each layer, the total number of propagation operations is $N^2/2$ instead of N for standard OA-LBM. This prevents N to be extremely high when aberration correction is needed but the time for dataset synthesis or computational source is limited.

Dataset Synthesis for CNN Training

A core limitation of OA-LBM is the requirement of sequential processing. To address that, we create a new dataset of LDIs and OA-LBM holograms, and train a CNN to accelerate the inference. To generate this dataset, three critical parameters need to be determined: the depth of the 3D volume, the number layers for LDIs, and the number of layers for OA-LBM.

Figure 8:
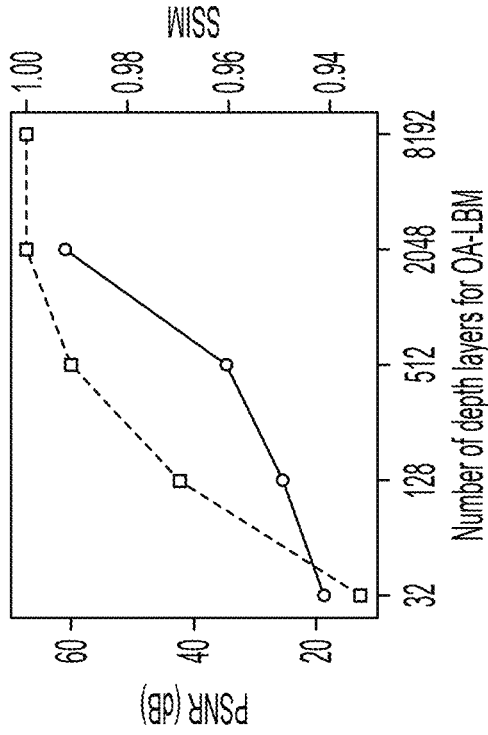
FIG. 8 is a depiction of the quality of OA-LBM holograms affected by the number of LDI layers and the number of depth layers in OA-LBM.
Figure 8:
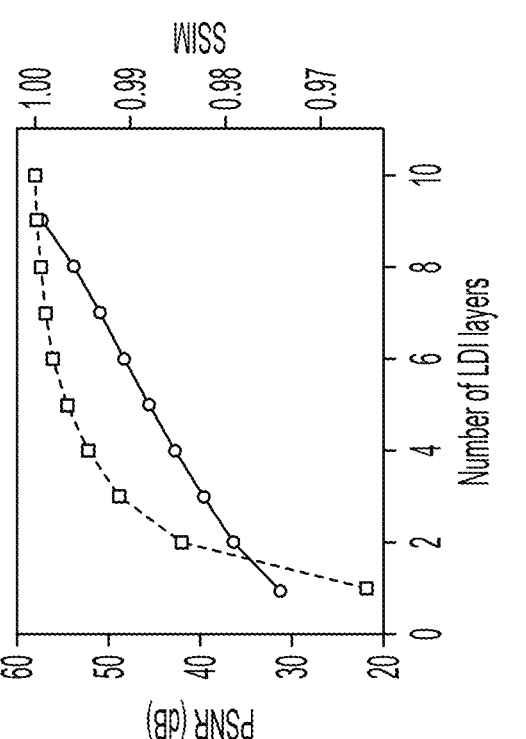

First, we set the depth of the 3D volume to be 6 mm measured for a collimated illumination, which is identical to what is disclosed above in accordance with the first embodiment to facilitate quantitative comparison. Using a 30 mm eyepiece can magnify this volume to cover 0.15 m to infinity from the eye. To render LDIs, we adopt the same random scene configuration (200-250 meshes) and the closed-form mesh distribution from the first embodiment to ensure a uniform pixel depth distribution for the first layer of the rendered LDIs. In addition, we only record the intersection with front-facing surfaces and cull the back-facing ones. To determine the number of layers for LDIs, we compute the mean PSNR and the mean SSIM for the amplitude maps of the holograms computed from LDIs with N=1, 2, . . . , 9 layers against the ones computed from LDIs with N=10 layers over 10 random scenes. As shown in FIG. 8, the mean SSIM plateaus after N=5, reflecting diminishing improvement for adding more layers. Thus, we choose N=5 for this work, but more layers can be used if a higher accuracy is required. Similarly, to determine the number of layers for OA-LBM, we compute holograms using $2^{N_d}$ layers for $N_d$=5, 7, 9, 11, and compare the mean PSNR and the mean SSIM of these holograms against the ones computed from $N_d$=13 over 10 random scenes. As shown in FIG. 8, the mean SSIM plateaus after $N_d$=11. However, because our GPU implementation of OA-LBM is highly optimized, we still choose a partition of 10000 layers, which was not demonstrated before, and is virtually equivalent to PBM and its variants. Overall, we rendered 4000 pairs of LDIs and holograms with 3800 for training, 100 for validation, and 100 for testing. The image resolution is 384×384 pixels. Because our CNN is fully convolutional, it can be used to evaluate inputs in arbitrary resolutions during inference. An example pair of dataset images can be found in Figure X/?.

Training CNNs for End-to-End Phase-Only Hologram Prediction

Given the CNN-predicted complex hologram, AA-DPM, as disclosed above with reference to the first embodiment, can be used to explicitly convert the CNN prediction to a phase-only hologram. However, this leads to a globally blurred result and requires multiple trials to obtain a minimally-blurred artifact-free result. When the hologram plane is far away from the 3D volume, the blur required to produce artifacts-free result also becomes stronger. This could compromise the image quality when designing compact display prototypes, where the distance between the SLM to the eyepiece needs to be minimized and the 3D volume needs to be computationally shifted a few millimeters backward.

A straightforward approach to making the whole process end-to-end is configuring the network to directly predict a general phase-only hologram and train the network with only the dynamic focal stack loss, namely minimizing the perceived image difference with respect to the one refocused from the ground truth complex hologram at different focal distances. However, the ablation study of the first embodiment has shown that removing the regularization of ground truth complex hologram will significantly lower the image quality even for complex hologram prediction. Therefore, constraining the hologram to be phase-only can only further degrade the results. Another disadvantage of learning a general phase-only hologram is that the hologram plane cannot be placed anywhere inside the 3D volume and the holograms likely require a long propagation distance (such as 20 cm in some published cases) to produce natural images with spatially-varying intensity distributions. This is because unlike double phase encoded holograms which explicitly enforces a high-frequency grating structure, a general phase-only hologram optimized via Wirtinger derivatives has no such guarantee and thus may take longer distances to properly diffract. In particular, if the hologram plane is set inside the 3D volume, the amplitude at the same plane has to be uniform. This is an extremely stringent requirement that would fail for any meaningful scenes.

Figure 9:
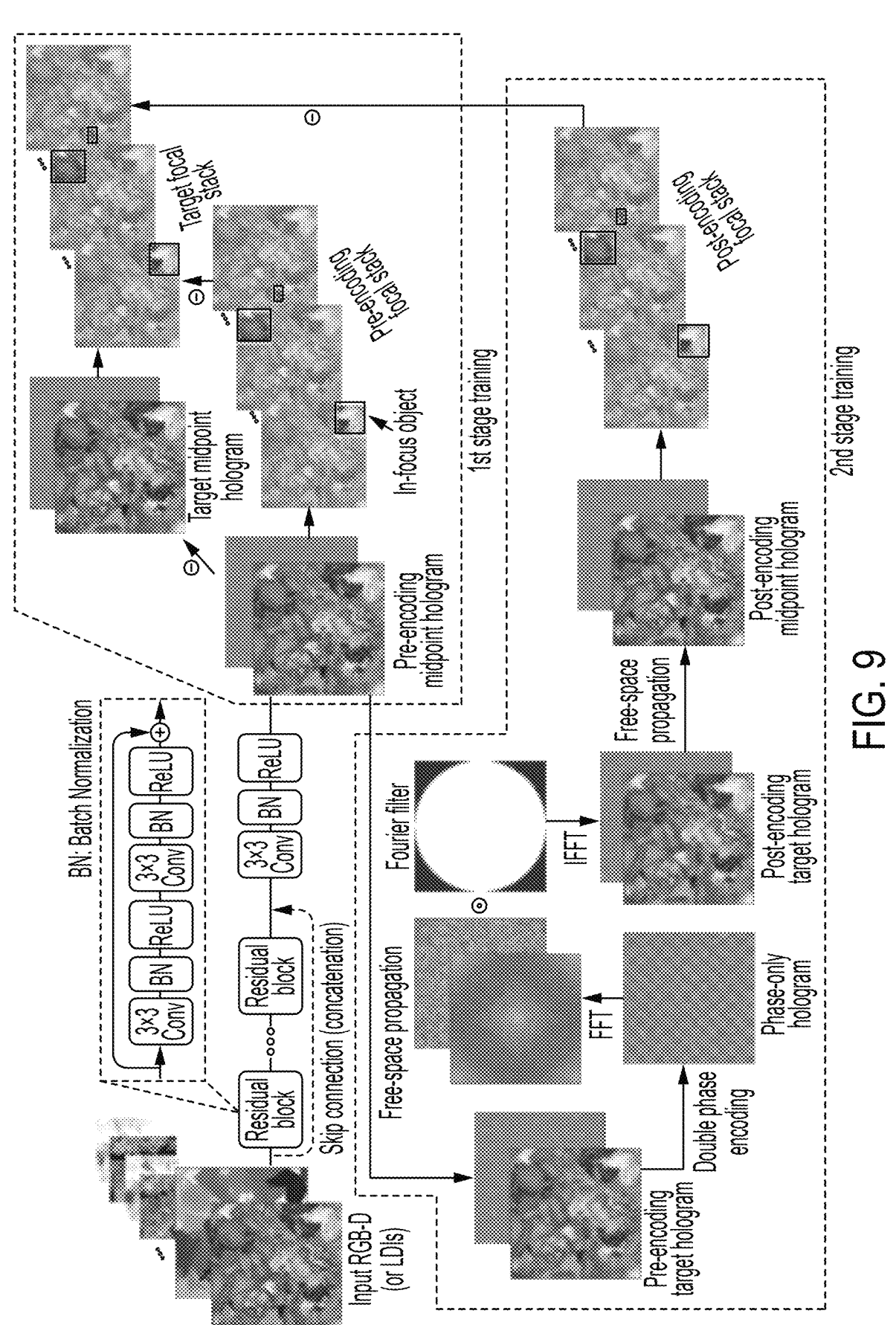
FIG. 9 is an overview of a training procedure.

Due to the aforementioned limitations, we take an alternative approach by still relying on the double phase principle to encode phase-only holograms, but relegating the CNN to discover the optimal pre-encoding complex holograms. FIG. 9 is an overview of the training procedure of the second embodiment. In the first training stage, the CNN is trained to reproduce the ground truth midpoint hologram with a data loss and a dynamic focal stack loss. In the second training stage, the CNN prediction is propagated to the target hologram plane, double phase encoded, Fourier filtered, and back propagated to the center of the 3D volume to obtain the post-encoding midpoint hologram. The CNN is trained with the dynamic focal stack loss between the post-encoding focal stack and the target focal stack plus a regularization loss on the phase map of the pre-encoding target hologram (loss not shown).

Our CNN architecture of the second embodiment is identical to the first embodiment. However, our training process of the second embodiment is split into two stages. The first stage remains the same as in the first embodiment, where the CNN is trained to predict the ground truth midpoint hologram (the target hologram propagated to the center of the 3D volume) with the regularization of a data fidelity loss and a dynamic focal stack loss. The midpoint hologram minimizes the maximum sub-hologram and thus the number of convolution layers required. Denote the network prediction as $\tilde{H}_{mid}=\tilde{A}_{mid}e^{i\tilde{\phi}_{mid}}$, and the ground truth midpoint hologram as $H_{mid}=A_{mid}e^{i\phi_{mid}}$. The data fidelity loss models the phase-corrected hologram difference $$l_{data} = w_{data} \left\| \tilde{A}_{mid} - A_{mid}e^{i\left(\overset{\text{corrected phase difference}}{\overbrace{\delta(\tilde{\phi}_{mid},\phi_{mid})-\overline{\delta}(\tilde{\phi}_{mid},\phi_{mid})}}\right)} \right\|_2 \quad (21)$$

where $w_{data}$ is the weight of data fidelity loss, $\delta(\tilde{\phi}_{mid}, \phi_{mid})$=a tan 2($\sin(\tilde{\phi}_{mid}-\phi_{mid})$,$\cos(\tilde{\phi}_{mid}-\phi_{mid})$), $\overline{\cdot}$ denotes the mean operator, $\|\cdot\|_p$ denotes the $\ell_p$ vector norm applied to a vectorized matrix output. The dynamic focal stack loss models the perceived image difference when focused at different focal distances, and the focal distances vary per training iteration based on image statistics and random sampling $$l_{pcp}(t) = w_{pcp} \quad (22)$$
$$\sum_{d'_t \in \{D_t^{fix} \cup D_t^{float}\}} e^{\beta(2\Delta d' - (d'_t - D'_t))} \left( \left\| ASM(\tilde{H}_{mid}, d'_t) - ASM(H_{mid}, d'_t) \right\|_1 + \right.$$
$$\left. \left\| \nabla ASM(\tilde{H}_{mid}, d'_t - \nabla ASM(H_{mid}, d'_t) \right\|_1 \right)$$

Here, $w_{pcp}$ is the weight of dynamic focal stack loss, $\nabla$ denotes the total variation operator; t is the training iteration;

$$D'_t$$

is the depth channel of the input RGB-D image; is a user-defined attention scale;

$$D_t^{fix}, D_t^{float}$$

are two sets of dynamic signed focal distances calculated as follows: (i) the 3D volume is equally partitioned into T depth bins, (ii)

$$D_t^{fix}$$

picks the top-$k_{fix}$ bins from $$D'_t$$

's histogram and $$D_t^{float}$$

randomly picks $k_{float}$ bins among the rest, (iii) a depth is uniformly sampled from each selected bin. Here, $$D_t^{fix}$$

guarantees the dominant content locations in the current RGB-D image are always optimized, while $$D_t^{float}$$

ensures sparsely populated locations are randomly explored. The random sampling within each bin prevents overfitting to stationary depths, enabling the CNN to learn true 3D holograms. The attention mask directs the CNN to focus on reconstructing in-focus features in each depth-of-field image. Note that the perceptual loss that minimizes the image features from activation layers in a pre-trained VGG-19 CNN can be further added to the loss function, but we defer loss function engineering to future optimizations.

Once the CNN well performs this task, we apply a series of differentiable operations to the network prediction. First, the network prediction is propagated to the target hologram plane to obtain the pre-encoding target hologram prediction $$\tilde{H}_{tgt-pre} = \tilde{a}_{tgt-pre}\tilde{A}_{tgt-pre}e^{i\tilde{\phi}_{tgt-pre}} = ASM(\tilde{H}_{mid}, d_{offset})\exp\left(-i\frac{2\pi d_{offset}}{\lambda}\right) \quad (23)$$

where $d_{offset}$ is the signed distance from the center of the 3D volume to the target hologram plane, $\tilde{A}_{tgt-pre}$ is the normalized amplitude, and $\alpha_{tgt-pre}$ is the scale multiplier. The exponential phase correction term is very important as it ensures the phase of the pre-encoding target hologram is still roughly centered at 0 for all color channels at the beginning of the second stage DDPM training. It is also critical to the success of AA-DPM, which minimizes the chance of phase warping. Next, standard double phase encoding is applied to obtain the phase-only hologram $$P(x, y) = \begin{cases} 0.5\tilde{a}_{tgt\text{-}pre}e^{i\left(\tilde{\phi}_{tgt\text{-}pre}e^{i\left(\tilde{\phi}_{tgt\text{-}pre}(x,y)-cos^{-1}\tilde{A}_{tgt\text{-}pre}(x,y)\right)}\right)} & \text{if } x+y \text{ is odd} \\ 0.5\tilde{a}_{tgt\text{-}pre}e^{i\left(\tilde{\phi}_{tgt\text{-}pre}e^{i\left(\tilde{\phi}_{tgt\text{-}pre}(x,y)-cos^{-1}\tilde{A}_{tgt\text{-}pre}(x,y)\right)}\right)} & \text{if } x+y \text{ is even} \end{cases} \quad (24)$$

Here, no pre-blurring is manually applied in contrast to AA-DPM. Third, the phase-only hologram is filtered in the Fourier space to obtain the post-encoding target hologram prediction $$\tilde{H}_{tgt\text{-}post} = \mathcal{F}^{-1}(\mathcal{F}(P) \odot M_{Fourier}) \quad (25),$$

where $M_{Fourier}$ models the circular aperture in the Fourier plane $$M_{Fourier}(x, y) = \begin{cases} 1, & x^2 + y^2 \leq r^2 \\ 0, & x^2 + y^2 > r^2 \end{cases} \quad (26)$$

Here, r is the radius of the aperture in the pixel space, and we set to half of the training image resolution to preserve as much high-frequency information as possible. Finally, the post-encoding target hologram prediction is propagated to the center of the 3D volume to obtain the post-encoding midpoint hologram $$\tilde{H}_{mid\text{-}post} = \text{ASM}(\tilde{H}_{tgt\text{-}post} - d_{offset}) \quad (27)$$

With the addition of these operations, the second stage training fine-tunes the CNN prediction using the dynamic focal stack loss (Eq. 22) with $\tilde{H}_{mid}$ replaced by $\tilde{H}_{mid\text{-}post}$ and a regularization loss on the phase of the pre-encoding target hologram $$l_{tgt\text{-}pre} = w_{tgt\text{-}pre}\left(\sqrt{\frac{\sum\left(\tilde{\phi}_{tgt\text{-}pre} - \overline{\tilde{\phi}_{tgt\text{-}pre}}\right)^2}{R_x R_y}} + \overline{\tilde{\phi}_{tgt\text{-}pre}}\right), \quad (28)$$

which encourages the mean phase to be centered at 0 and a solution among all possibilities with a small standard deviation. This term is extremely important for achieving good experimental results as it minimizes the chance of phase warping during double phase encoding. When this loss is not enforced, the phase of the learned pre-encoding target hologram tends to produce a large standard deviation and shifts away from zero mean, leading to non-negligible amount of phase warping during the encoding stage, especially when the maximum phase modulation is limited to $2\pi$ (see FIG. 16). Note that, in simulation, phase warping does not affect the image quality, but in practice it does severely degrade the experimental result quality.

We split the training into two stages for several reasons. First, we find enforcing data fidelity loss on the post-encoding midpoint hologram results in inferior results. This is because after Fourier filtering, the filtered phase pattern can be considerably different from the original as it selectively drops the high-frequency information to avoid speckle noise caused by aliasing during encoding. Thus, enforcing it to be still similar to the ground truth makes a negative impact. Since we only care about the perceived image quality, it is beneficial to let the CNN discover the optimal phase map by removing this constraint. Yet, if we train the CNN with just the dynamic focal stack loss and the regularization loss from scratch, we also observe inferior results as was evidenced by the ablation study in our first embodiment. The current two-stage training first optimizes the CNN to reconstruct the ground truth hologram with as much high-frequency information as possible, and then regularizes it to produce an artifact-free image with minimal loss of information. This turns out to be much more effective. In addition, when multiple CNNs need to be trained for different hologram plane configurations, starting training from the 1st stage CNN can significantly reduce training time compared with training each configuration from scratch.

Based on this training protocol, we train two versions of CNNs. The first version takes the full LDI input (with all layers concatenated along the color channel), while the second version takes only the first layer of the LDI, essentially a single RGB-D image. In the latter case, the CNN has an additional job to hallucinate the occluded pixels near the occlusion boundaries before filling the missing wavefront. Both CNNs are trained with a batch size of 2, $w_{data}=1.0$, $w_{pcp}=1.0$, $w_{tgt\text{-}pre}=0.07$, $\beta=0.35$, $T=200$, $k_{fix}=15$, and $k_{float}=5$.

Holographic Display

Figure 10:
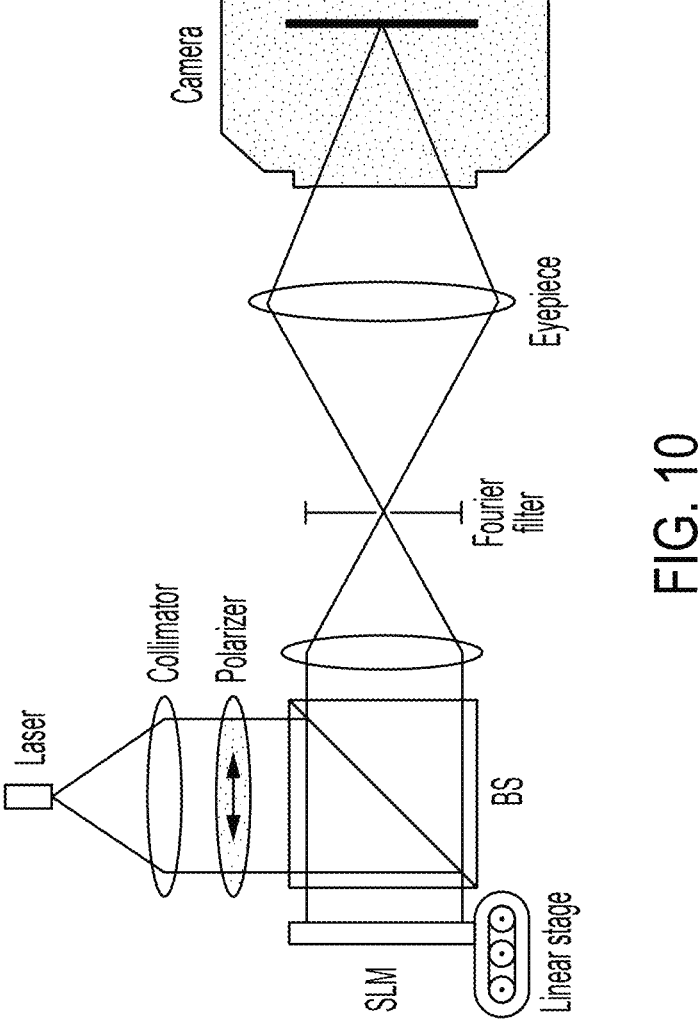
FIG. 10 is a holography display setup.

FIG. 10 shows a schematic of our display setup. The linear stage is adjusted to maintain the projected 3D volume stationary when holograms with different relative distance to the 3D volume are displayed. The physical setup is similar to the multifocal VR benchtop prototype by Maimone. The setup uses a HOLOEYE PLUTO (VIS-014) phase-only LCoS with a resolution of 1920×1080 pixels and a pixel pitch of 8 um. This SLM provides a refresh rate of 60 Hz (monochrome) with a bit depth of 8 bits. The laser is a FISBA RGBeam fiber-coupled module with three optically aligned laser diodes at wavelengths of 638, 520, and 450 nm. The diverging beam emitted by the laser is collimated and polarized to match the SLM's working polarization direction. The beam is directed to the SLM by a plate beamsplitter, and the SLM is mounted on a linear translation stage. When displaying holograms with different relative position to the 3D volumes, we adjust the linear translation stage to maintain the position of 3D volumes and thus avoid tuning the following imaging optics. The modulated wavefront is imaged by a 125 mm achromat and magnified by a Meade Series 5000 21 mm MWA eyepiece. An aperture is placed at the Fourier plane to block excessive light diffracted by the grating structure and higher order diffractions. A SONY A7M3 mirrorless full-frame camera paired with a 16-35 mm f/2.8 GM lens is used to photograph the results. A Labjack U3 USB DAQ is used to send field sequential signals and synchronize the display of color-matched phase-only holograms.

Compensating Hardware Imperfections

Recent studies have shown that hardware imperfection can cause experimental results to deviate significantly from the desired simulations. For our prototype, we conclude three sources of error that need to be compensated: laser source intensity variation as a Gaussian beam, SLM's non-linear voltage-to-phase mapping, and optical aberrations. While we could borrow the hardware-in-the-loop optimization pipeline from the previous works, it would be non-trivial to run for 3D holograms with per-pixel depth and likely requires much more iterations for different focal distances. In this work, we put simplicity first and employ a set of fast calibration procedures, which is sufficient to grant high-quality experimental results.

To calibrate the laser source intensity variation, we substitute the SLM with a diffuser and capture the reflected beam as a scaling map. A 5×5 median filter is applied to the measurements to avoid pepper noise caused by dust in optical elements. A Gaussian mixture model can be further used to compute an analytical approximation of this look-up table to reduce memory cost. However, this does not affect the result quality.

There are many methods for calibrating the non-linear voltage-to-phase mapping for phase-only SLMs, and they can be generally categorized into interferometry-based and diffraction-based. Interferometry-based methods measure the displacement of fringes from the interference pattern formed between a reference beam and a modulated beam. In particular, self-referenced methods evenly split the SLM with one half showing a static Ronchi (binarized) grating or sawtooth grating and the other half changing uniformly from 0 to 255 (assuming 8-bit depth). The beam diffracted by the grating overlaps with the beam reflected from the uniform region after certain distance of propagation and creates self-interference. Out-referenced methods use a beam reflected by a gently tilted mirror as a modulation beam. In the meantime, the SLM is evenly split with one half set uniformly to 0, which creates a reference fringe pattern, and the other half change uniformly from 0 to 255 to create modulated patterns. In general, this line of methods are simple to operate, but have several limitations. First, the displacement and fringe pattern is very sensitive to vibrations, thus great care must be taken to stabilize both the optics and the camera during the whole capture process. Second, high pixel count cameras are often needed for precise calibration since the subtle displacement between successive two frames are often sub-pixel for many cameras. Third, it is considerably time-consuming and error-prone to extend the methods to obtain a multi-regional look-up table and almost impossible to reach a per-pixel level.

Diffraction-based methods leverage the change of far-field or near-field diffraction patterns to induce phase change on the SLM. One method of this kind displays a Ronchi grating pattern over the entire SLM and relies on the change of intensity at the far-field when holding the low phase value at 0 and changing the high phase value from 0 to 255. The other variant uses a binary Fresnel zone plate and monitor the change of intensity at the first foci when holding the low phase value as 0 and changing the high phase value from 0 to 255. Because the intensity measurement is insensitive to vibration and modern full frame cameras have decent low light sensitivity and high dynamic range RAW measurement, diffraction-based methods are often more robust and have higher accuracy. However, both methods require the use of the entire or a large portion of the SLM and thus only produce a global look-up table.

Here, we disclose a new calibration procedure based on double phase encoding, which produces a per-pixel look-up table. Before the calibration, we unload any global look-up table used by the SLM and set all pixel values to 0. Then, for every 2-by-2 grid, we keep the top right and bottom left pixels at 0, and increase the top left and bottom right pixels jointly from 0 to 255. Without modifying the imaging optics, we set the camera focus right on the SLM and capture the change of intensity across the entire frame. Based on the double phase principle, if the phase modulation range for the operating wavelength is greater than or equal to $2\pi$, the captured intensities will decrease to the minimum at $1\pi$ offset, return back to the maximum at $2\pi$ phase offset, and repeat this process for every $2\pi$ cycle. Denote the captured intensity of the k-th frame be $I_k$, the absolute angular difference in the polar coordinate induced by setting the pixel from 0 to k is $$\theta_k(x, y) = 2\cos^{-1}\left(\frac{\sqrt{I_k}(x, y) - \sqrt{I_{min}}(x, y)}{\sqrt{I_{max}}(x, y) - \sqrt{I_{min}}(x, y)}\right) \quad (29)$$

where $I_{min}(x, y)$ and $I_{max}(x, y)$ are the minimal and maximal intensities measured at $(x, y)$ when sweeping from 0 to 255. Let $k_{min}(x, y)$ be the frame id associated with the minimal measurement at $(x, y)$, the phase difference induced by setting from 0 to k is $$\phi_k(x, y) = \begin{cases} \theta_k(x, y), & k \le k_{min}(x, y) \\ 2\pi - \theta_k(x, y), & k > k_{min}(x, y) \end{cases} \quad (30)$$

Figure 11:
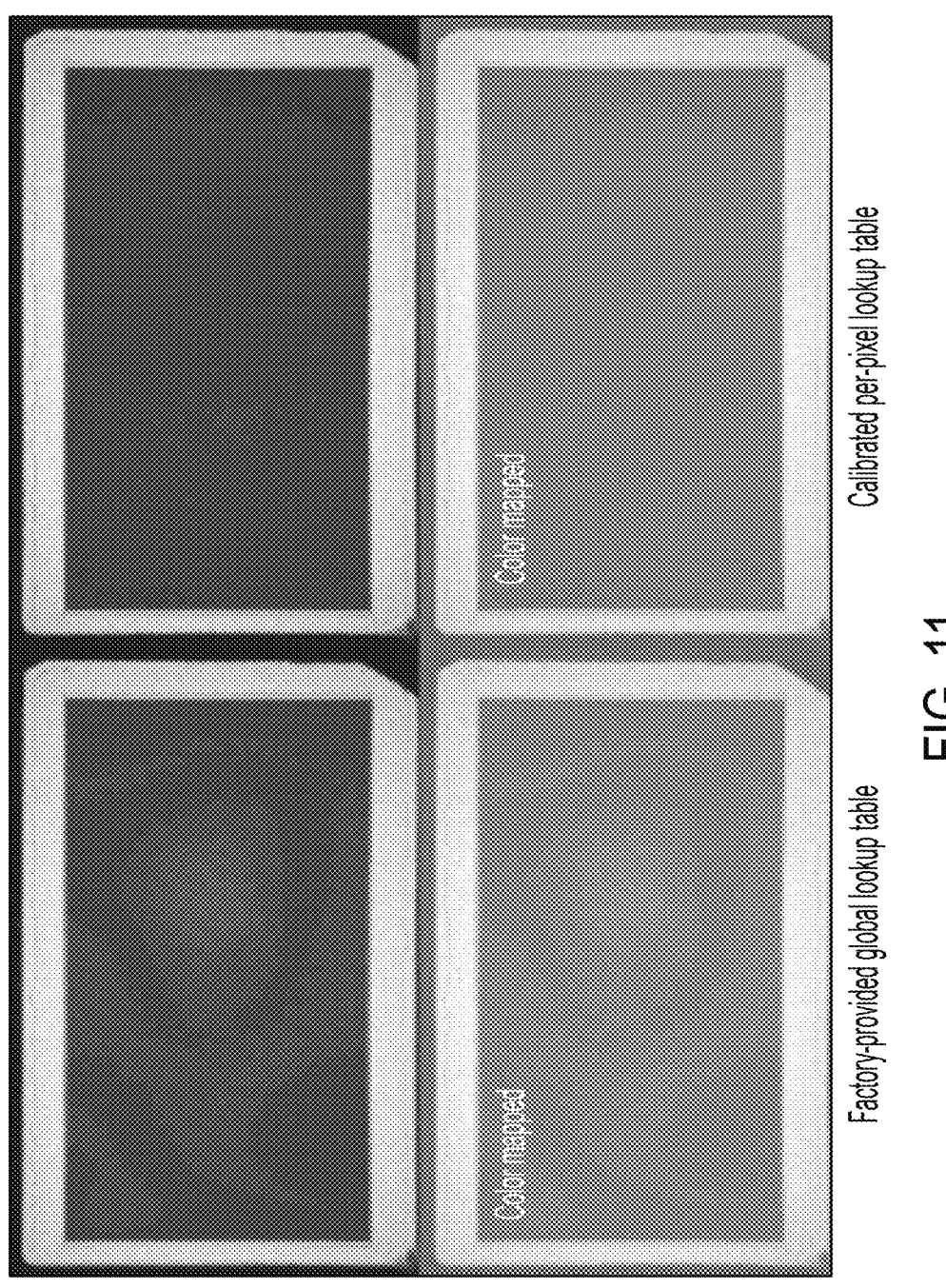
FIG. 11 is a depiction of results of a black modulation test using double phase encoding.

Because our camera measurement is 24 MP, the resolution of the captured SLM region is higher than the SLM resolution. Therefore, we down sampled the measurement and ran the calculation to obtain a per-pixel look-up table. For simplicity, we directly load it into the GPU memory at the inference time. A more memory-efficient approach would be learning a multi-layer perceptron and apply it as a 1×1 convolution, but this does not affect the result quality. In FIG. 11, showing a black modulation test using double-phase encoding, we compare a uniform black image achieved by the factory-provided lookup table and the per-pixel lookup table calibrated in our method. Using the per-pixel lookup table calibrated with the approach disclosed herein produces a much more uniform image with better black level over the one achieved by the factory-provided lookup table.

The optical aberrations are corrected using a variant of the method proposed by Maimone. We begin by repeating their procedure, where the same 5 Zernike coefficients are used to adjust a perfect sub-hologram (Fresnel zone plate) until a tightly focused spot is formed at the desired focal distance. Let $\phi_d \in \mathbb{C}^{R_x \times R_y}$ be the corrected sub-hologram (zero-padded to the frame resolution) for a point d away from the hologram plane, it is back propagated to the point location to obtain the corrected point spread function $PSF_d = ASM(\phi_d, -d)$. In our aberration correction enabled OA-LBM, we convolve the occlusion-processed layer at d with $PSF_d$ in the frequency domain through element-wise product with $\Phi_d = \mathcal{F}(PSF_d)$, which corresponds to Eq. 20. Note that this procedure can be performed for different depths similar to Maimone, and parameters can be linearly interpolated.

For compact setups with strong aberrations (i.e. Maimone's compact AR prototype), spatially-varying aberration correction is often necessary. In this case, we can calibrate the display at multiple points (i.e. 15 points), and update the above procedure by convolving a spatially varying $PSF_d(x, y)$ calculated by interpolating the nearest measured parameters. Note that this operation can only be performed in the spatial domain, but not in the Fourier domain. However, GPU can be used to accelerate this process and speed is ultimately not critical for the sake of generating a dataset. On the learning side, the CNN needs to receive an additional two-channel image that records the normalized xy coordinates in order to learn aberration correction in a spatially-varying manner.

Software

The LDIs in the dataset are rendered in OpenGL using depth peeling. The OA-LBM and OA-PBM are implemented in NVIDIA CUDA and used to render the holograms. All hardware calibration procedures are implemented in Python. The CNNs are implemented and trained using TensorFlow 1.15 (Google LLC, Menlo Park, CA) on an NVIDIA RTX 8000 GPU using Adam optimizer. The TensorFlow library is further described in Abadi, M, et. al., *TensorFlow: A System for Large-Scale Machine Learning, 12th USENIX Symposium on Operating Systems Design and Implementation* (*OSDI*), 265-283 (2016). The learning rate is 0.0001 with an exponential decay rate of $\beta_1$=0.9 for the first moment and $\beta_1$=0.99 for the second moment. The first stage training runs for 3000 epochs, and the second stage training runs for 1000 epochs. The code to drive the SLM and synchronize the laser is implemented in Python using Labjack Python SDK and HOLOEYE Python SDK. The iPhone demo is implemented in Apple Swift and Core ML.

We measured the runtime of all algorithms on an NVIDIA TITAN RTX GPU and the runtime of CNNs on an iPhone 12 Pro for full HD (1920×1080 PX) inputs. On the TITAN RTX GPU, OA-LBM with 10000 layers ran for 87.1 seconds. OA-PBM ran for 3.4 seconds. Comparing the two physically-based methods, OA-LBM is significantly slower than OA-PBM due to sequential processing. On GPU, the 8-layer CNN runs at 60 Hz (17 ms per frame). The 15-layer CNN ran for 25 ms per frame, and the 30-layer version for 40 ms. We expect the 30-layer version to run in real-time on the high-end version of the latest NVIDIA RTX 30 series GPU. Leveraging the neural engine in the latest Apple A14 Bionic, all CNNs run less than 1 s on the iPhone 12 pro with the 8-layer version runs at roughly 2 Hz (580 ms per frame). The 15-layer and 30-layer versions run at 663 ms and 851 ms per frame, respectively.

Results

Figure 12A:
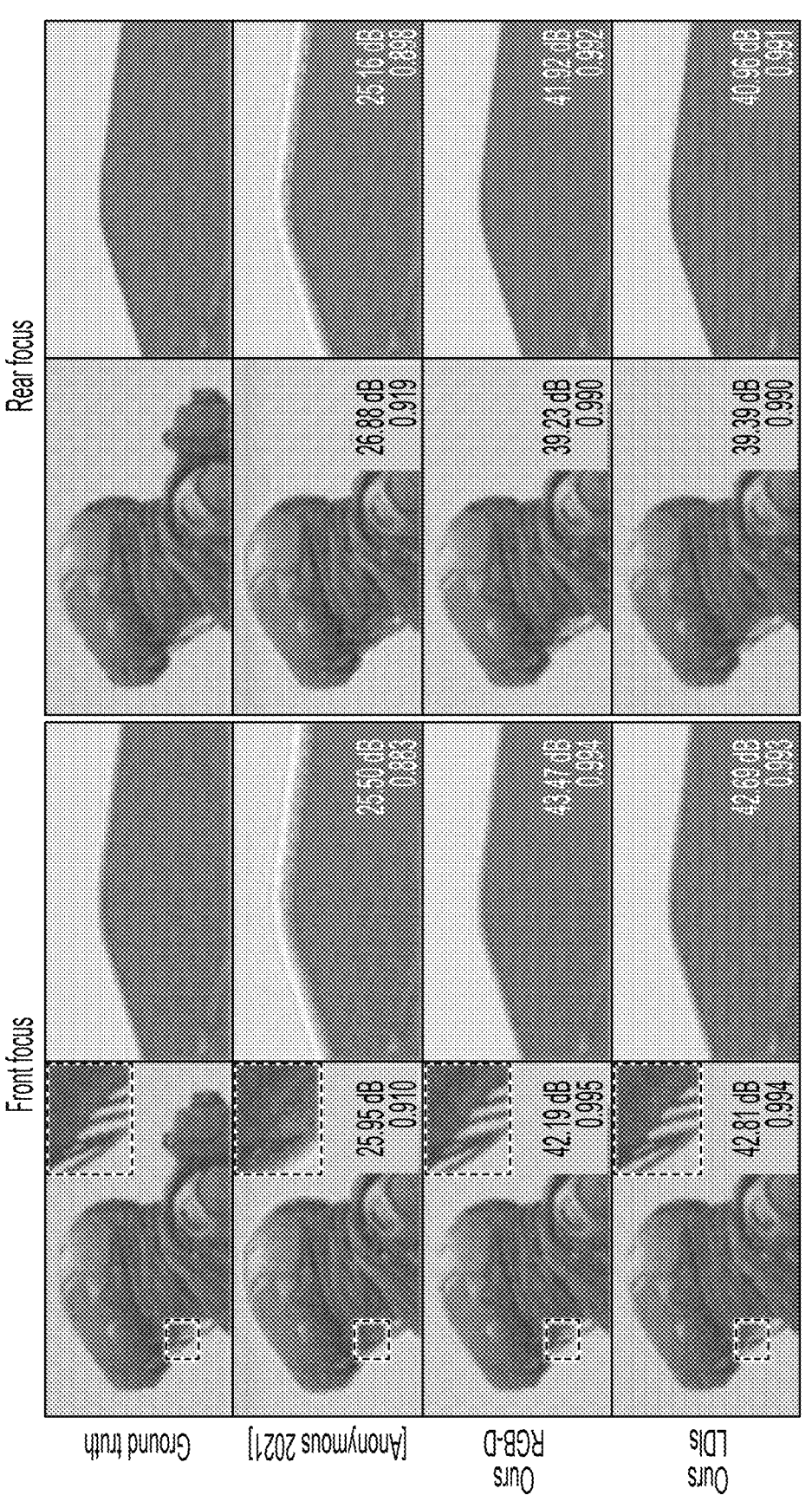
FIG. 12 is a comparison of results prior to phase-only encoding.
Figure 12B:
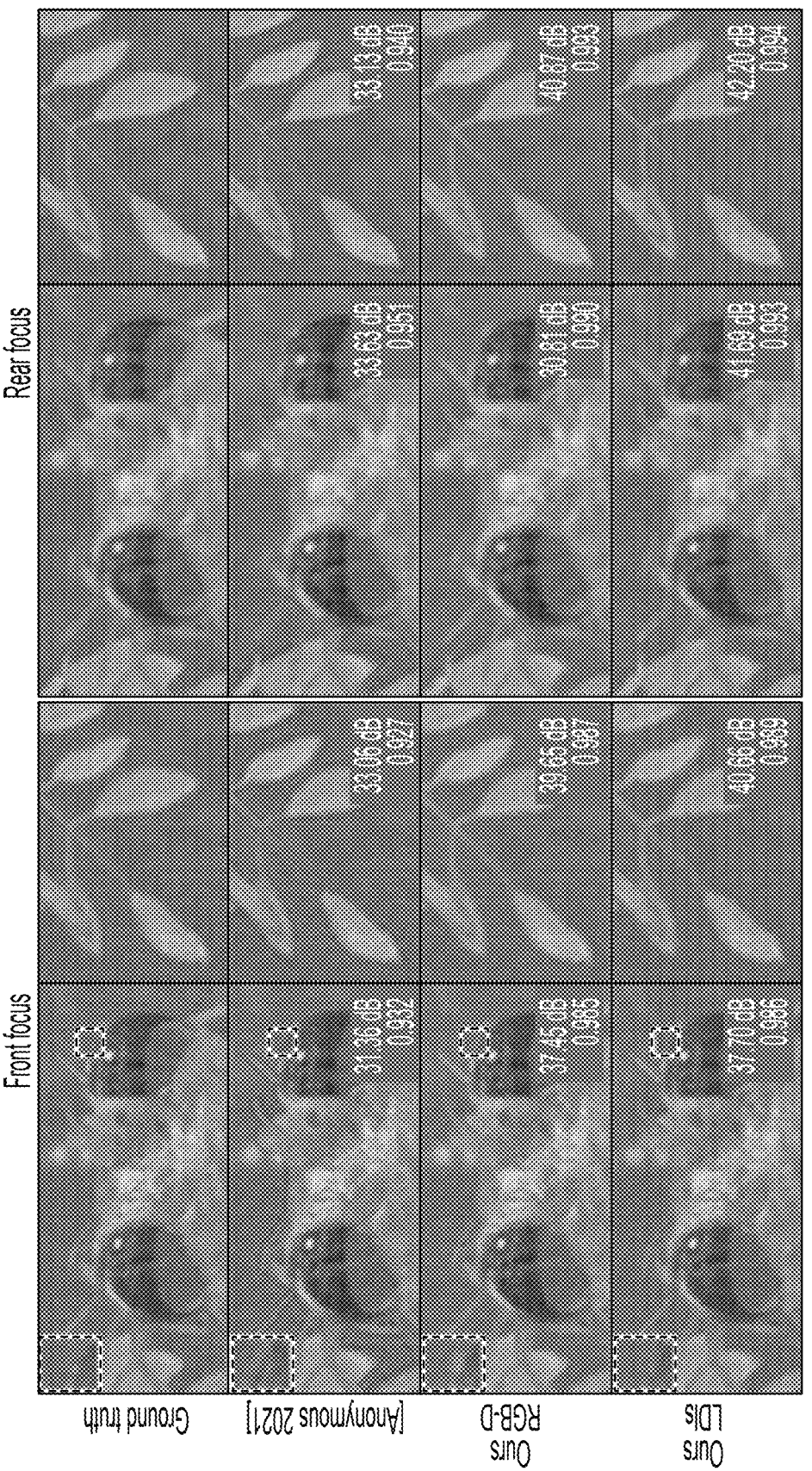
Figure 13A:
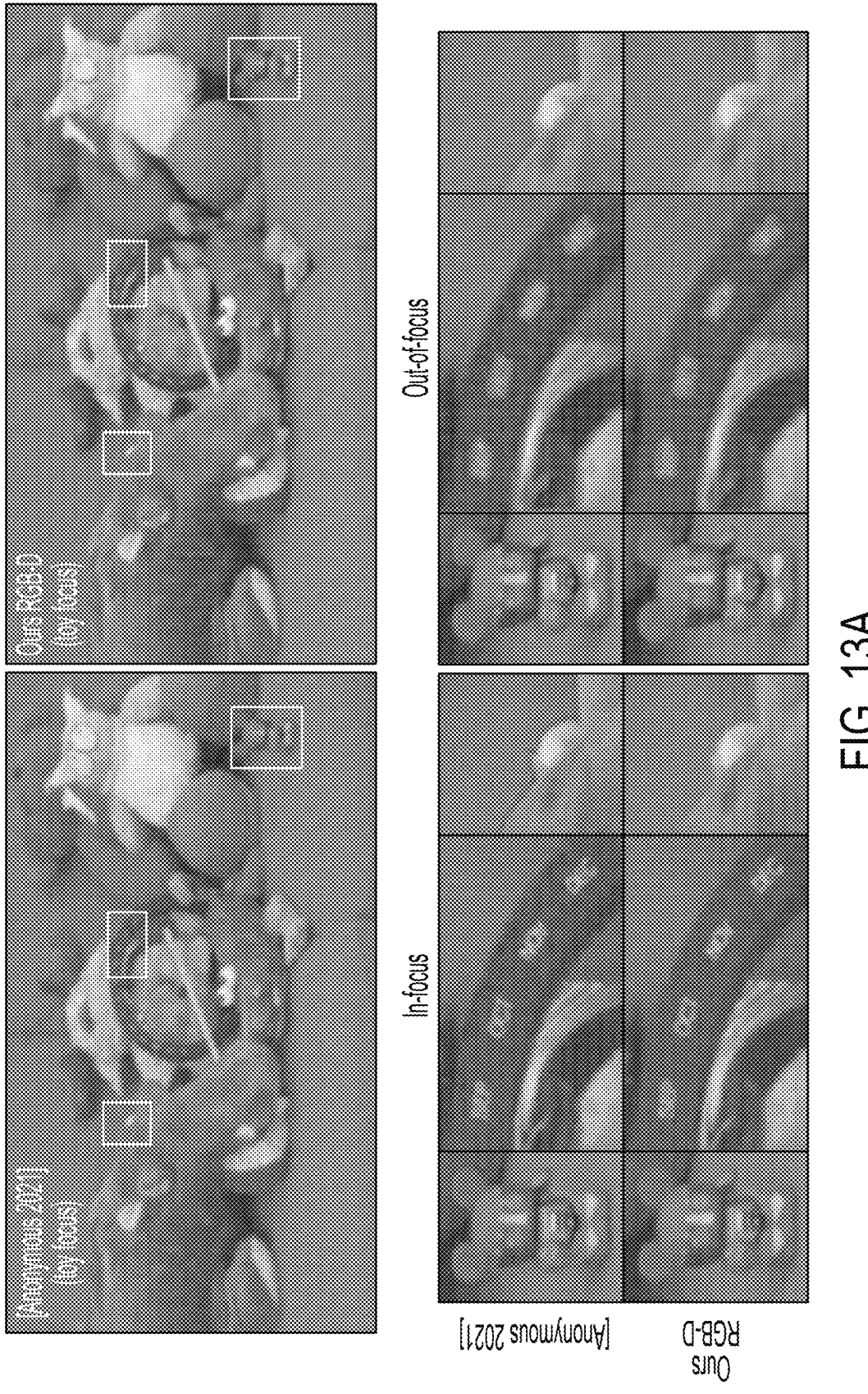
FIG. 13 is a comparison of results prior to phase-only encoding.
Figure 13B:
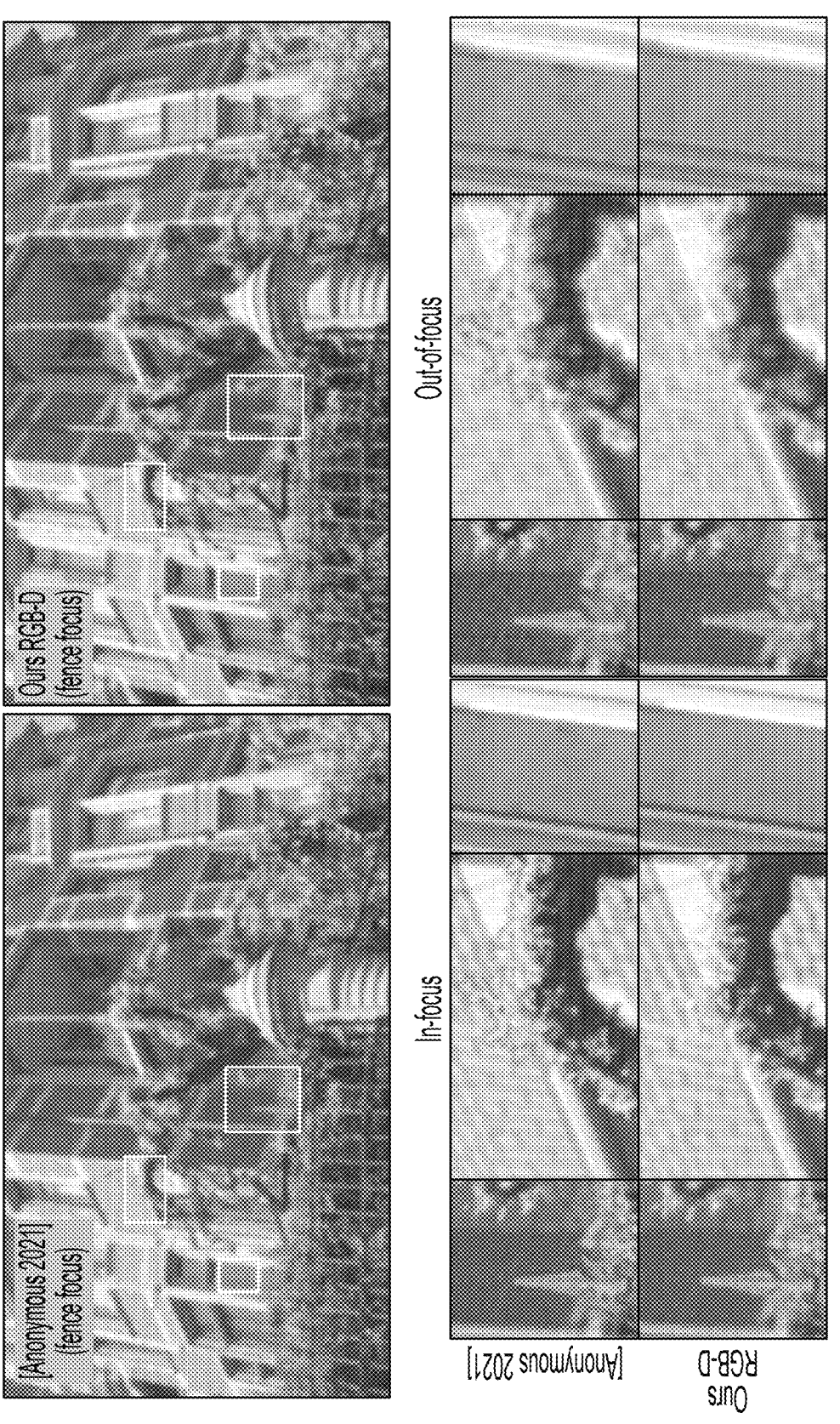

We evaluate our RGB-D and LDI network against the first embodiment and the ground truth computed using OA-LBM. The network of the first embodiment is retrained using a dataset generated by OA-LBM to emphasize comparison on the advantage of using holograms computed from an LDI. All examples are evaluated on the CNNs trained right after the first stage training and prior to phase-only encoding. FIG. 12 qualitatively and quantitatively compares the results on computer rendered scenes. The results of the first embodiment are labeled "[Anonymous 2021]." The bottom right corner number marks the PSNR and SSIM. Our RGB-D version significantly reduces the background artifacts at occlusion boundaries via implicit estimation of background pixels and inclusion of missing wavefronts. The LDI version further produces a slightly sharper foreground and avoids the artifacts caused by the RGB-D version due to hallucination of the occluded background pixels. The table in the following paragraph compares ours CNNs of the second embodiment against the first embodiment and Maimone on the validation set. FIG. 13 compares the results on real-world captured scenes. Compared to rendered scenes, captured RGB-D images exhibit depth misalignment and inconsistency. The CNN of the first embodiment is vulnerable to these input artifacts while the CNN of the second embodiment consistently produces visually plausible results. The RGB-D version is significantly more robust to depth map misalignment (artifacts around the mouth and perpetual calendar), inconsistency (artifacts on the window), and results in much more natural defocus blurs (leaves in the mansion example).

The following table is a quantitative comparison against the 3D hologram prediction network of the first embodiment and a naive point based method calculated from a single RGB-D input as disclosed in Maimone. The unbracketed result is calculated for the amplitude map of the predicted hologram, the bracketed result is calculated by averaging the results of a focal stack with 15 most frequent depths and 5 random depths for each image.

| | PSNR (dB) | SSIM |
|---|---|---|
| | 21.6 | 0.816 |
| | (21.3) | (0.808) |
| First embodiment | 23.6 | 0.830 |
| | (23.2) | (0.821) |
| Second embodiment (RGB-D) | 29.4 | 0.945 |
| | (28.9) | (0.942) |
| Second embodiment (LDI) | 29.6 | 0.947 |
| | (29.1) | (0.944) |

Figure 14A:
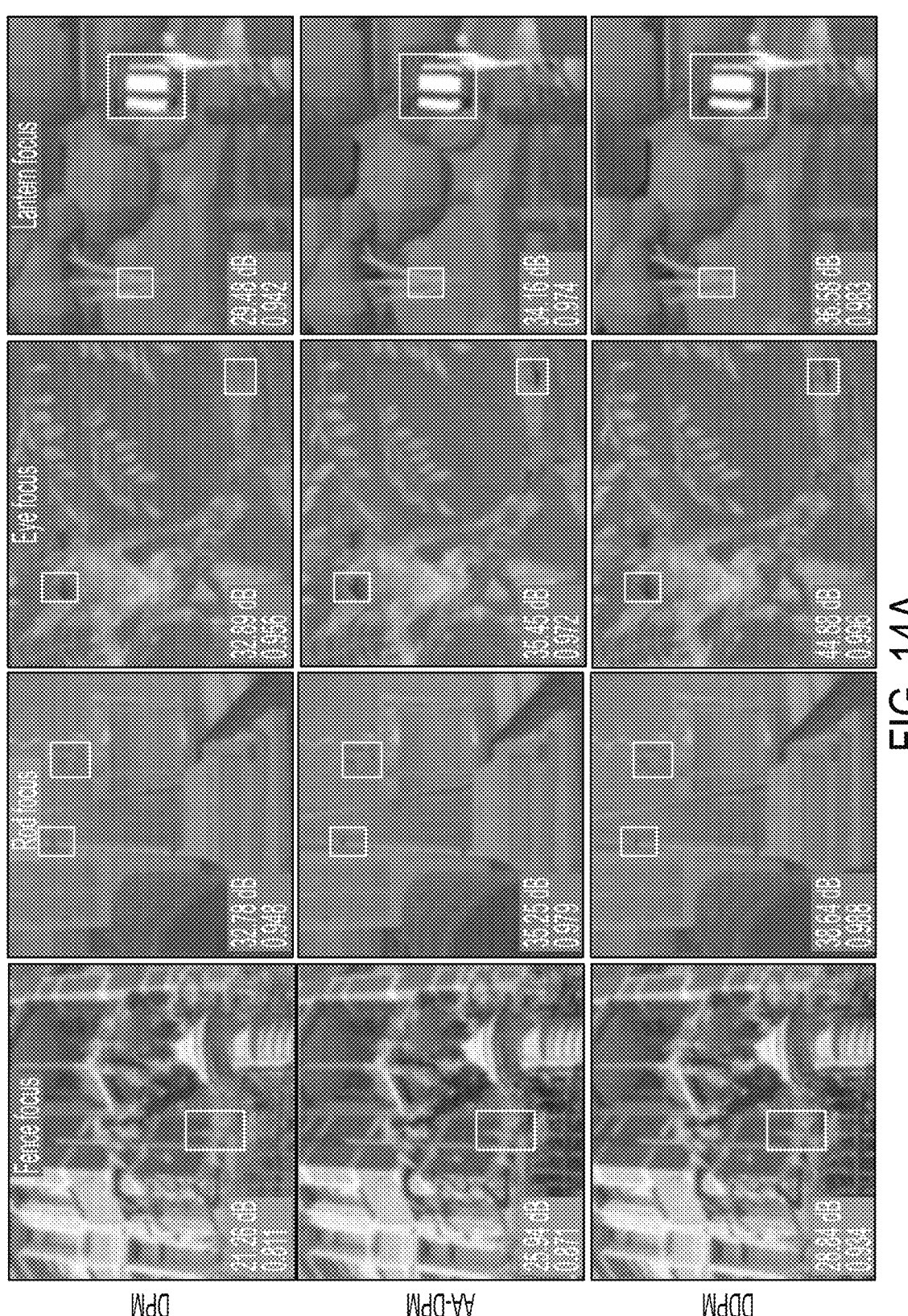
FIG. 14 is a comparison of phase only-holograms.
Figure 14B:
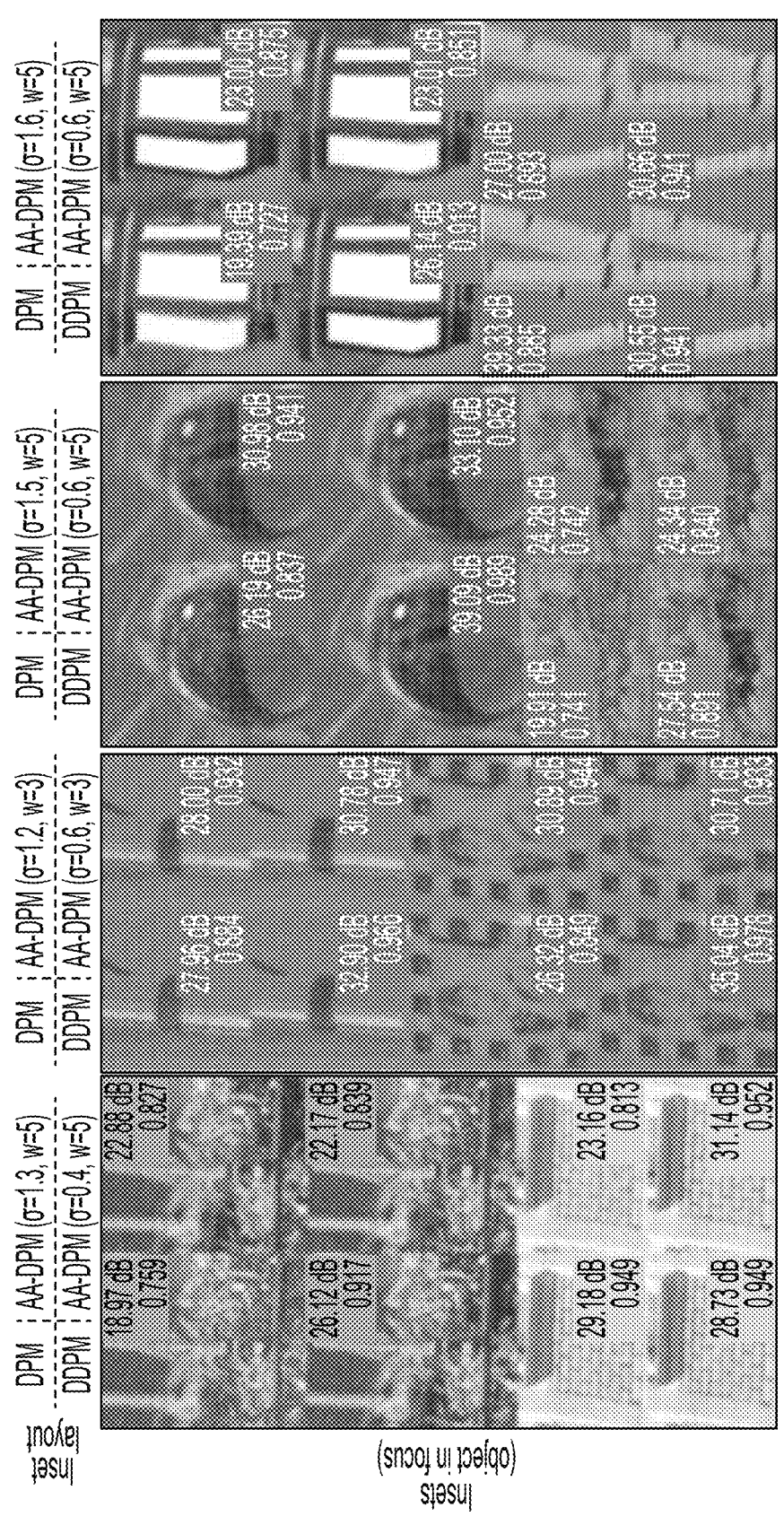

FIG. 14 compares DDPM against DPM and AA-DPM with two different blur kernels. The kernel with higher standard deviation is the minimal blur required to produce an artifact-free (or almost free) reconstruction, while the one with lower standard deviation results in a similar image sharpness to the DDPM results. The hologram plane for all results are set to the center of the 3D volume. For each example, two AA-DPM results computed using different amounts of blur are demonstrated. The one with less blur is chosen to produce similar sharpness to the DDPM results. For all examples, DDPM is capable of preserving more high-frequency information while avoiding speckle-like noise for regions with various image statistics. DDPM can produce sharp results while avoiding artifacts across the entire image, especially at the selected high contrast (eye and lantern), high frequency (rod and tile), low amplitude (trunk and the sky in the lantern scene), and detail rich (fence) regions. Due the fact that DDPM is optimized with a Fourier space hard cutoff (which simulates the physical aperture), some examples (the wall brick and lantern) exhibits slight fringing artifact and yields slightly lower PSNR and SSIM than the highest among the group, although a higher image resolution is visually achieved.

Figure 15:
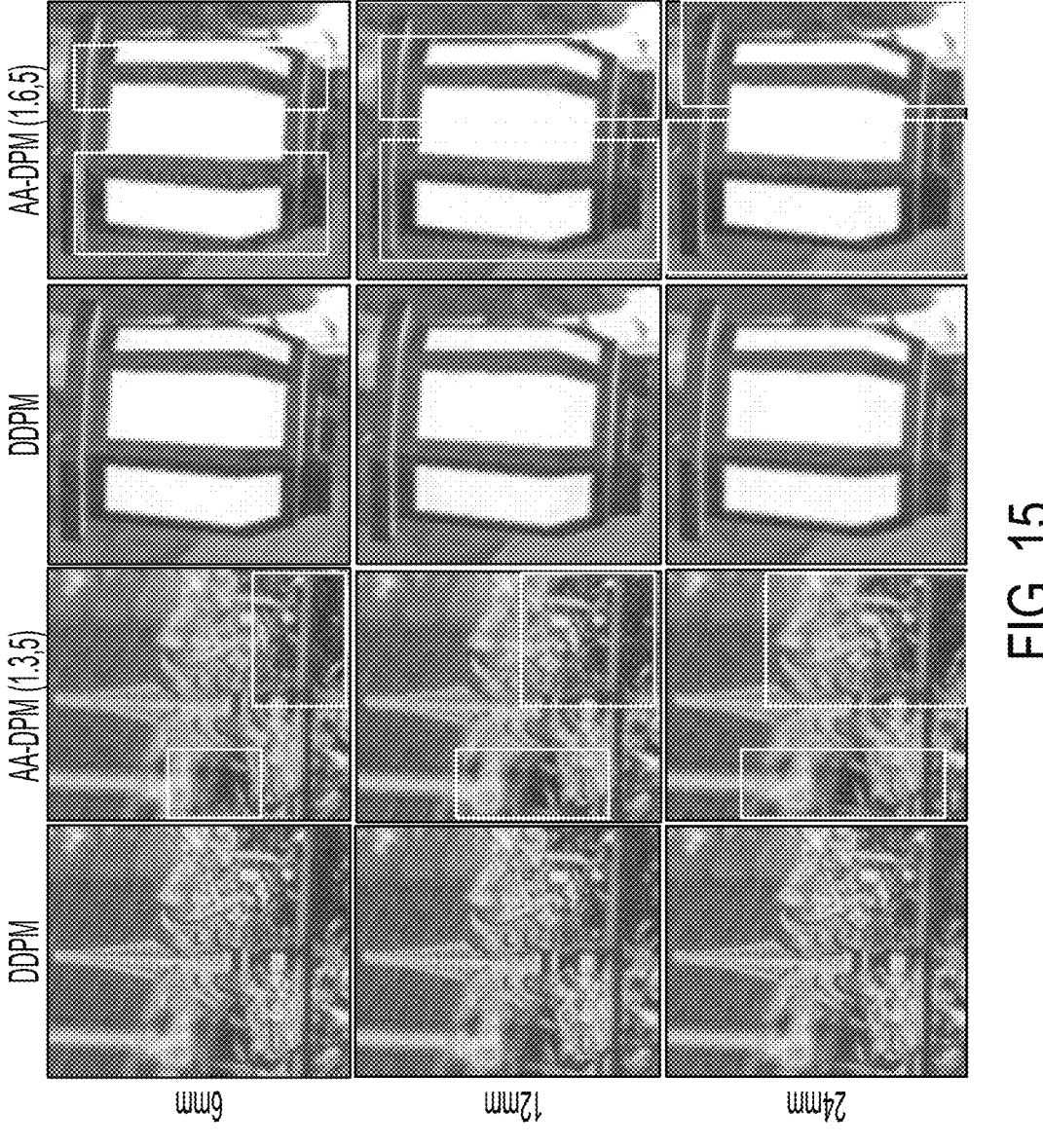
FIG. 15 is a comparison of performance for different hologram plane arrangements.

FIG. 15 extends the comparison for different hologram plane arrangements. The labelled distance is the distance from the hologram plane to the center of the 3D volume. The blur kernels for AA-DPM are marked in the bracket and remain the same as the ones used in FIG. 14. When the hologram plane shifts away from the 3D volume center, using the same amount of blur for AA-DPM starts to produce minor ringing artifacts, and the artifacts grow bigger as the distance gets further. This is caused by the growing sub-hologram size and more high-frequency fringes at the periphery of the sub-hologram. DDPM trained for each configuration avoids these artifacts and preserves the image resolution at slight degradation of contrast.

Figure 16:
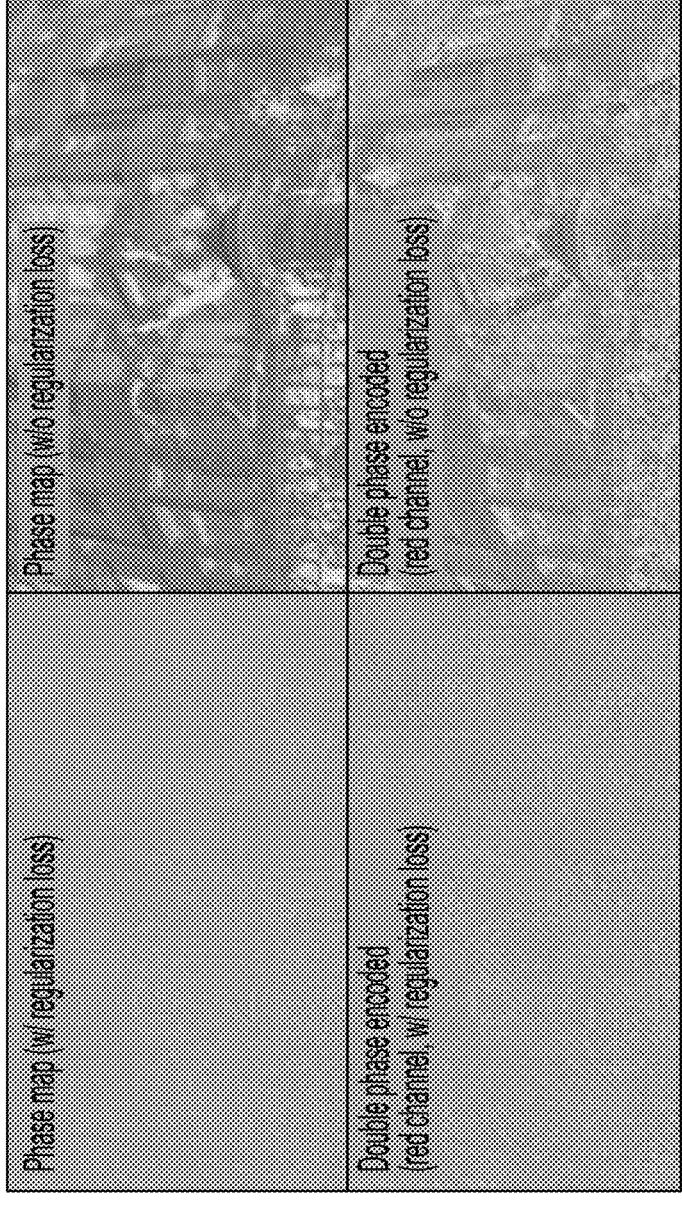
FIG. 16 is a comparison of pre-encoding hologram phase maps and encoded double phase holograms trained with and without regularization loss.

FIG. 16 compares the pre-encoding target hologram phase map and the encoded double-phase (with $2\pi$ phase range) encoded phase-only hologram produced by CNNs trained with and without the regularization loss. The target plane is 3 mm in front of the 3D volume and 6 mm away from the midpoint hologram. Without regularization loss, the phase map is smooth, but shifts away from zero mean with a high standard deviation. The resulting phase-only hologram contains multiple phase-warped regions. The addition of regularization loss eliminates both problems.

Experimental Results

Figure 17:
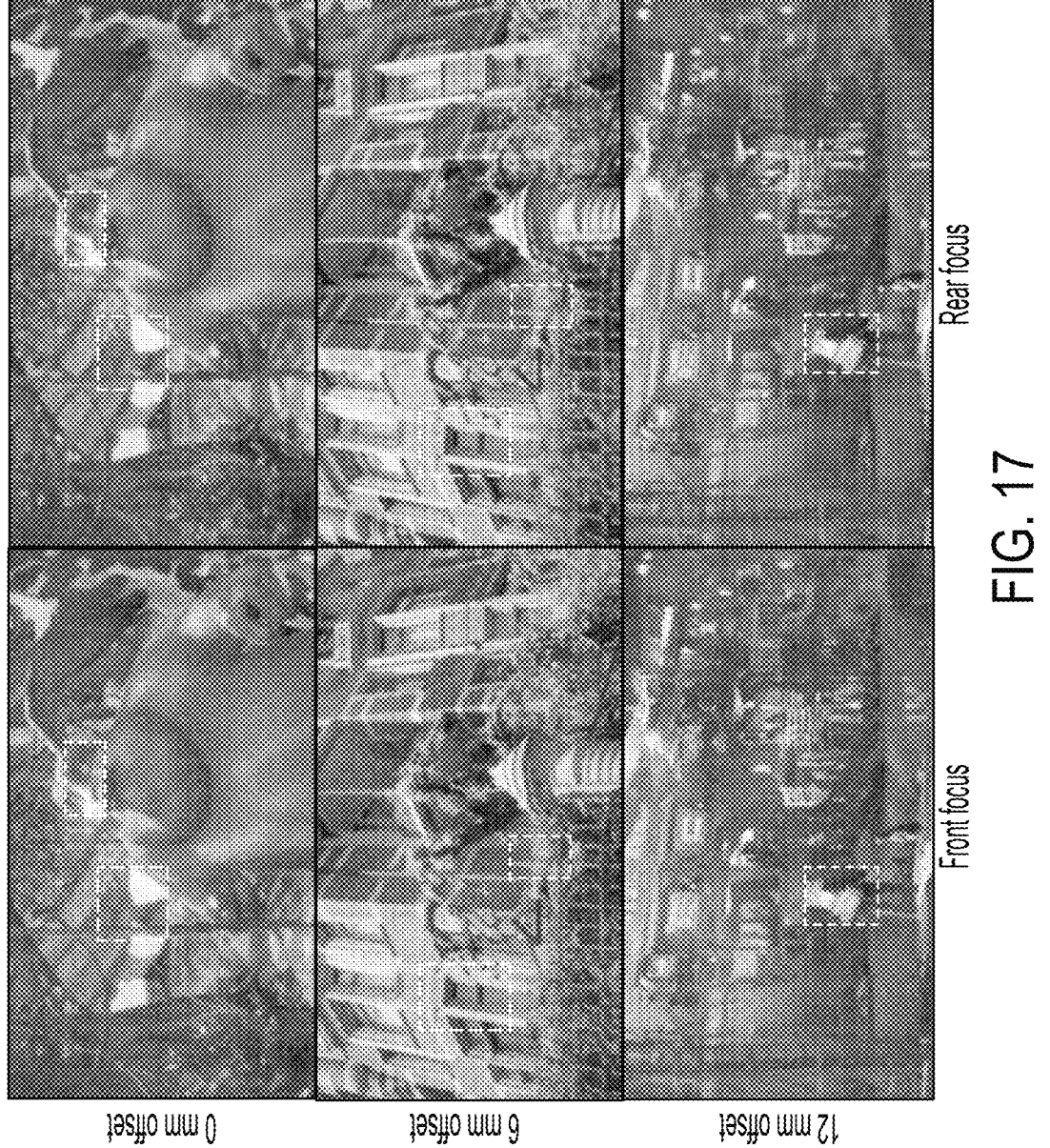
FIG. 17 is a depiction of CNN predicted phase-only 3D holograms.

In FIG. 17, we show experimentally captured phase-only high-quality true 3D holograms. The distance on the left marks the distance from the hologram plane to the center of the 3D volume. The boxes mark the foreground of interest and background of interest. Our bunny reconstruction completely removes the black seams surrounding its body due to lack of modeling wavefront from occluded pixels and the dataset inaccuracy due to ray-based modeling. In the mansion scene, the fence (in front focus) is kept sharp when the hologram plane shifts away from the 3D volume center and matches well to the simulation in FIG. 15. The use of DDPM also avoids the ringing artifacts that would appear if AA-DPM is employed. In the rear focus, no artifact is produced on the window (in the blue box) as our CNN is robust to depth inconsistency. In the boat scene, our hologram manages to produce smooth color gradients owing to the highly-accurate per-pixel voltage-to-phase lookup table, and no significant drop of image resolution is observed when the hologram plane shifts further away. In all three scenes, our end-to-end predicted phase-only holograms produce no speckle noises and achieves decent display contrast.

Figure 18:
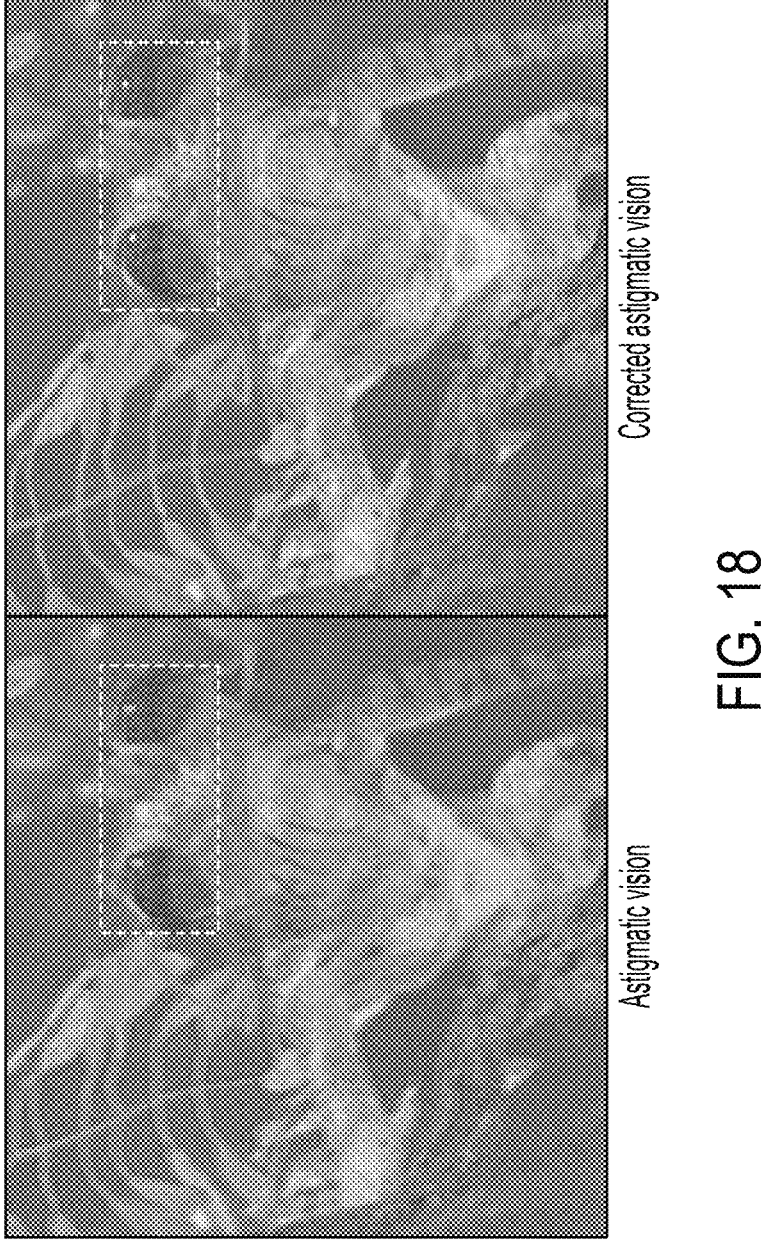
FIG. 18 is a depiction of holographic vision correction.

In FIG. 18, we demonstrate aberration correction for a selected region of the tree frog example. Similar to Maimone, we use a cylindrical lens with a focal length of 200 mm to induce fairly severe vertical astigmatism. With this astigmatic vision, we observe the associated blurring primarily along the horizontal component as compared to holograms viewed with normal vision. We apply the aforementioned calibration procedural and regenerated the dataset with aberration corrected holograms. Due to the high computational cost, the dataset is only generated with 256 depth layers, which appears to be sufficient for this fairly layered scene. After aberration correction, the tree frog's eye can be correctly focused and the result matches the simulation computed without aberration.

Figure 19:
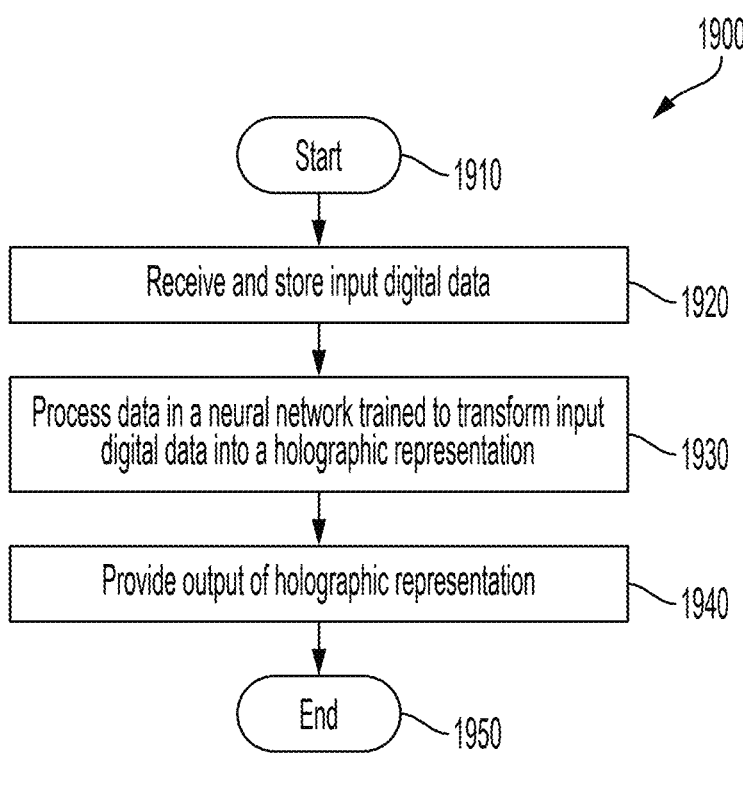
FIG. 19 is a flowchart of a method for producing a hologram.

FIG. 19 is a method 1900 of producing a hologram in accordance with an embodiment of the present invention. The method begins at step 1910. In step 1920, input digital data characterizing a first image of the subject three-dimensional scene is received and stored.

In step 1930, the data is processed in a neural network that has been trained to transform the input digital data into a holographic representation of the subject three-dimensional scene. The representation may contain phase information characterizing depth and parallax of the scene. Alternatively or in addition, the representation may be computed to take into account effects of wave-based occlusion with respect to the complete scene. In some embodiments, the neural network has been further trained in two stages to directly optimize the phase-only hologram (with anti-aliasing processing) by incorporating a complex to phase-only conversion into the training. In a first stage the neural network is trained to predict a midpoint hologram propagated to a center of the subject three-dimensional scene and to minimize a difference between a target focal stack and a predicted focal stack. In a second stage a phase-only target hologram is generated from the predicted midpoint hologram and refined by calculating a dynamic focal stack loss, between a post-encoding focal stack and the target focal stack, and a regularization loss associated therewith.

In step 1940, an output of the holographic representation of the subject three-dimensional scene is provided. The method ends at step 1950.

Figure 20:
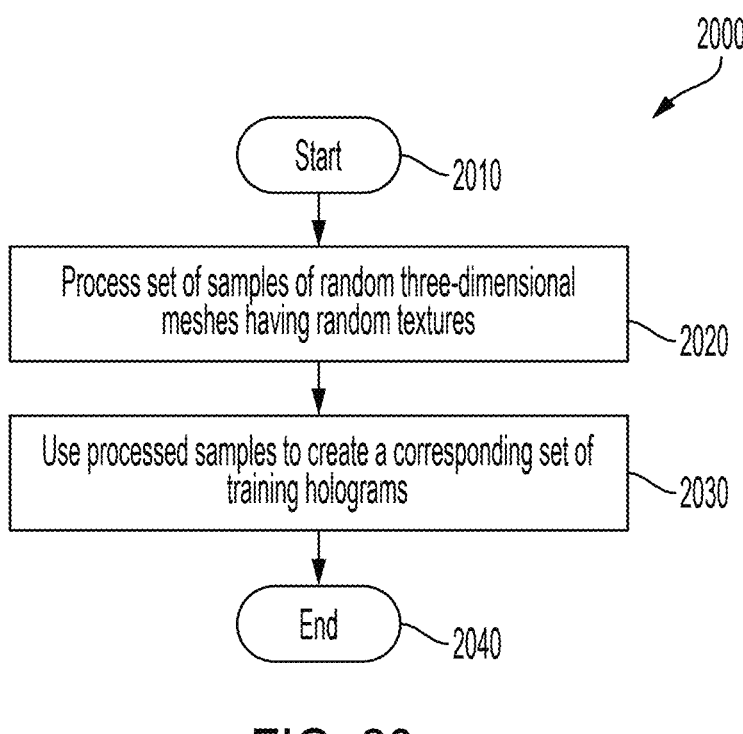
FIG. 20 is a flowchart of a method for generating a data set configured for training a neural network.

FIG. 20 is a method 2000 of generating a data set configured for training a neural network for use in processing data associated with a three-dimensional scene. The method begins at step 2010. In step 2020, a set of samples of random three-dimensional meshes is processed. The set of samples has random textures in a manner that a surface of the mesh defines a set of pixels representing the scene in the three-dimensional space. The meshes are configured to cause the set of pixels to have a uniform pixel distribution across a range of depths.

In step 2030, the processed set of samples is used to create a corresponding set of training holograms. The method ends at step 2040.

Figure 21:
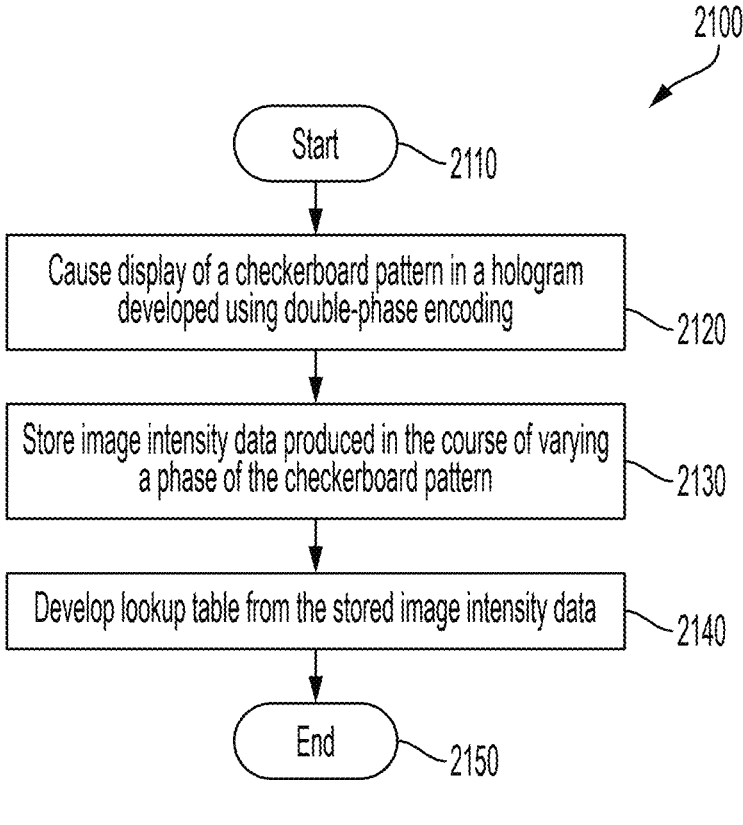
FIG. 21 is a flowchart of a method for calibrating a holographic display.

FIG. 21 is a method 2100 of calibrating a holographic display. The method begins at step 2110. In step 2120, the method causes display of a checkerboard pattern in a hologram developed using double-phase encoding. In step 2130, image intensity data produced in the course of varying a phase of the checkerboard pattern is stored.

In step 2140, a lookup table is developed from the stored image intensity data to compensate for nonlinearities in the holographic display. The method ends at step 2150.

The embodiments of the invention described above are intended to be merely exemplary; numerous variations and modifications will be apparent to those skilled in the art. All such variations and modifications are intended to be within the scope of the present invention as defined in any appended claims.

What is claimed is:

1. A method for producing a hologram representative of a subject three-dimensional scene, the method comprising:
   receiving and storing input digital data characterizing a first image of the subject three-dimensional scene;
   processing the data in a neural network that has been trained to transform the input digital data into a holographic representation of the subject three-dimensional scene, the representation containing phase information characterizing depth and parallax of the scene; and
   providing an output of the holographic representation of the subject three-dimensional scene.

2. A method according to claim 1, wherein the holographic representation encodes color information of the scene.

3. A method according to claim 1, wherein the neural network is a convolutional neural network.

4. A method according to claim 1, wherein the digital data characterizing the first image includes color and depth information, and the holographic representation including amplitude and phase information by color.

5. A method according to claim 1, wherein processing the data is configured to produce a holographic representation that reproduces occlusion effects.

6. A method according to claim 1, wherein the neural network has been trained to simulate Fresnel diffraction.

7. A method according to claim 6, wherein the neural network has been additionally trained to cause the holographic representation to exhibit a desired depth of field effect.

8. A method according to claim 1, wherein the neural network has been trained on training data representing scenes constructed from samples of random three-dimensional meshes having random textures.

9. A method according to claim 8, wherein the training data are configured to follow a probability density function in such a manner as to have a uniform pixel distribution across a range of depths.

10. A method according to claim 1, further comprising, before providing the output of the holographic representation, performing anti-aliasing processing of the holographic representation to render it displayable with reduced artifacts.

11. A method for producing a hologram representative of a subject three-dimensional scene, the method comprising:
   receiving and storing input digital data characterizing a set of images of the subject three-dimensional scene;

processing the data in a neural network that has been trained to transform the input digital data into a phase-only holographic representation of the subject three-dimensional scene, the representation containing phase information characterizing depth and parallax of the scene, wherein the representation is computed to take into account effects of wave-based occlusion with respect to the scene; and providing an output of the holographic representation of the subject three-dimensional scene.

12. A method according to claim 11, wherein the holographic representation encodes color information of the scene.

13. A method according to claim 11, wherein the neural network is a convolutional neural network.

14. A method according to claim 11, wherein processing the data further includes performing aberration correction.

15. A method according to claim 11, wherein the neural network has been additionally trained to cause the holographic representation to be focused on any desired focal plane within the subject three-dimensional scene so as to exhibit a desired depth of field.

16. A method according to claim 11, wherein the neural network has received additional training in two stages to directly optimize the phase-only hologram with anti-aliasing processing by incorporating a complex to phase-only conversion into the training, wherein in a first stage the neural network is trained to predict a midpoint hologram propagated to a center of the subject three-dimensional scene and to minimize a difference between a target focal stack and a predicted focal stack, and in a second stage a phase-only target hologram is generated from the predicted midpoint hologram and refined by calculating a dynamic focal stack loss, between a post-encoding focal stack and the target focal stack, and a regularization loss associated therewith.

17. A method according to claim 11, wherein the digital data characterize a stream of images occurring at an average frame rate, and the processing is configured to occur in real time.

18. A method according to claim 11, wherein the set of images of the subject three-dimensional scene includes a plurality of layered depth images.

19. A method according to claim 11, wherein the set of images of the subject three-dimensional scene is a single RGB-D image.

20. A method for producing a hologram representative of a subject three-dimensional scene, the method comprising:

receiving and storing input digital data characterizing a set of images of the subject three-dimensional scene;

processing the data in a neural network that has been trained to transform the input digital data into a phase-only holographic representation of the subject three-dimensional scene and has been further trained in two stages to directly optimize the phase-only hologram with anti-aliasing processing by incorporating a complex to phase-only conversion into the training, wherein in a first stage the neural network is trained to predict a midpoint hologram propagated to a center of the subject three-dimensional scene and to minimize a difference between a target focal stack and a predicted focal stack, and in a second stage a phase-only target hologram is generated from the predicted midpoint hologram and refined by calculating a dynamic focal stack loss, between a post-encoding focal stack and the target focal stack, and a regularization loss associated therewith, the representation containing phase information characterizing depth and parallax of the scene; and providing an output of the holographic representation of the subject three-dimensional scene.

21. The method of claim 20, wherein the post-encoding focal stack is generated by applying a differentiable wave propagation operator to the phase-only target hologram at a plurality of focal planes, and parameters of the neural network are updated based on the dynamic focal stack loss computed from the generated focal stack.

* * * * *